United States Patent [19]
Yamaura et al.

[11] Patent Number: 5,504,776
[45] Date of Patent: Apr. 2, 1996

[54] SPREAD SPECTRUM COMMUNICATION SYSTEM AND TRANSMITTER-RECEIVER

[75] Inventors: Tomoya Yamaura; Katsuya Yamamoto, both of Kanagawa; Jun Iwasaki, Tokyo; Etsumi Fujita, Chiba, all of Japan

[73] Assignee: Sony Corporation, Tokyo, Japan

[21] Appl. No.: 206,906

[22] Filed: Mar. 4, 1994

Related U.S. Application Data

[62] Division of Ser. No. 942,708, Sep. 9, 1992, Pat. No. 5,321,721.

[30] Foreign Application Priority Data

| Sep. 13, 1991 | [JP] | Japan | 3-234608 |
| Sep. 13, 1991 | [JP] | Japan | 3-234619 |
| Jun. 26, 1992 | [JP] | Japan | 3-169676 |

[51] Int. Cl.$^6$ .................................................. H04B 1/69
[52] U.S. Cl. .................... 375/208; 375/358; 455/226.3
[58] Field of Search .............................. 375/1, 208, 358; 455/226.3

[56] References Cited

U.S. PATENT DOCUMENTS

| 4,930,140 | 5/1990 | Cripps et al. | 375/1 |
| 5,128,959 | 7/1992 | Bruckert | 375/1 |
| 5,199,045 | 3/1993 | Kato | 375/1 |
| 5,245,629 | 9/1993 | Hall | 375/1 |
| 5,297,161 | 3/1994 | Ling | 375/1 |

*Primary Examiner*—Gilberto Barron, Jr.
*Attorney, Agent, or Firm*—Jerry A. Miller; Karin L. Williams

[57] ABSTRACT

A spread spectrum communication system for performing spread spectrum communication by superimposing a pseudo noise signal on a transmitted signal. The system comprises traffic detecting means for detecting the traffic of the transmitted signal, and means for changing the clock frequency of the pseudo noise signal in accordance with the output from the traffic detecting means. The system may alternatively comprise transmission quality determining means for determining the transmission quality of the received signal, and means for changing the clock frequency of the pseudo noise signal in accordance with the transmission quality determined by the transmission quality determining means. In operation, the system offers improved S/N ratios where traffic is high or transmission quality is low, saves power where traffic is low or transmission quality is high and ensures large margins of power control precision for mobile stations near the upper limit of the system's line capacity.

15 Claims, 27 Drawing Sheets

$Bp = 1/Tp$

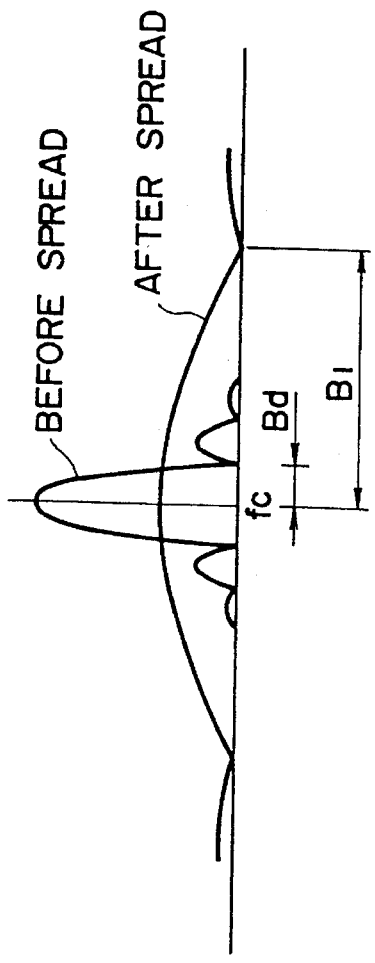
FIG. 15A  SPREAD OVER BAND B1
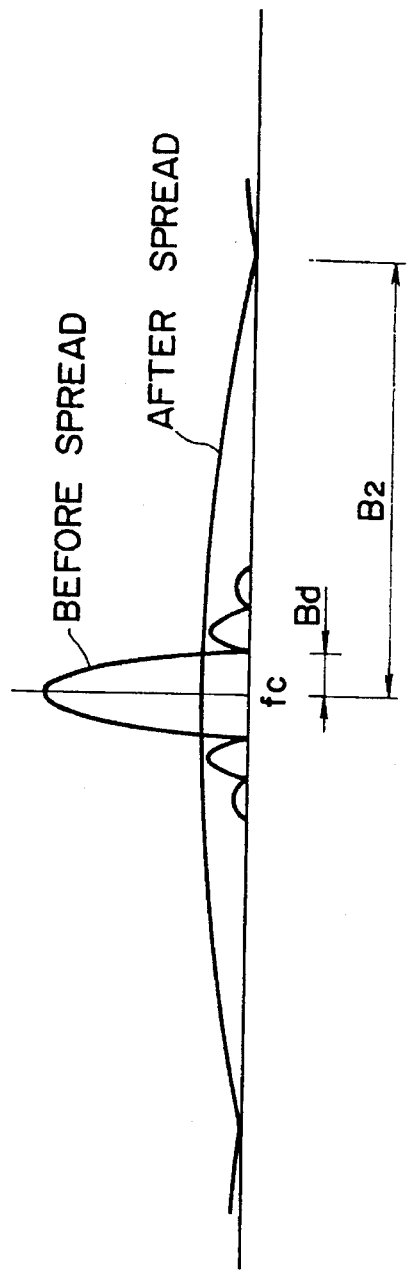
FIG. 15B  SPREAD OVER BAND B2

SPREAD SPECTRUM COMMUNICATION SYSTEM AND TRANSMITTER-RECEIVER

This is a divisional of application Ser. No. 07/942,708 filed on Sep. 9, 1992, now U.S. Pat. No. 5,321,721 which is hereby incorporated by reference.

BACKGROUND OF THE INVENTION

1. Field of the Invention

The present invention relates to a spread spectrum communication system and a transmitter-receiver based on CDMA (code division multiple access) and, more particularly, to a spread spectrum communication system and a transmitter-receiver capable of adaptively changing the power level of transmitted signals.

2. Description of the Related Art

The spread spectrum communication system works in principle as follows: The transmitter of the system modulates (spreads) by pseudo noise (PN) a carrier that carries data. The receiver subjects the received carrier to a PN-coded correlation (reverse spread) process, the PN being generated by an encoder structurally identical to the one used by the transmitter. The PN-code correlation process is followed by base band demodulation that restores the transmitted data. Under this spread spectrum communication scheme, the density of power per unit frequency is low. This means that a minor increase in noise level accompanying a higher traffic, insignificant For other kinds of communication, can lead to a degenerated S/N (signal-to-noise) ratio with the spread spectrum communication system. The raised noise level hampers efforts to communicate using a desired signal under the spread spectrum communication scheme.

One prior art solution to the above problem is to widen the frequency band of spread spectrum signals while lowering the power density per unit frequency. This requires enhancing the clock rate of the transmitter, which means greater power dissipation. In that case, even if traffic is low, the clock rate remains unnecessarily high reflecting the increased power consumption.

FIG. 1 is a block diagram of a modulating portion in a transmitter for use with a conventional direct spread spectrum communication system. In FIG. 1, a carrier generator 201 generates a carrier fc for input to a PSK (phase shift keying) modulator 202. The PSK modulator 202 subjects the carrier fc to bi-phase shift keying modulation using a transmitted signal (binary coded signal) d(t) from an input terminal 203. The PSK-modulated signal from the PSK modulator 202 is supplied to a spread spectrum modulator 204. The spread spectrum modulator 204 is fed with a spread signal p(t) from a PN generator 205 that generates a PN (pseudo noise) code sequence. Using the spread signal p(t), the modulator 204 subjects the PSK-modulated signal to spread spectrum modulation.

FIG. 2A is a view of a typical change in the transmitted signal d(t) used by the modulation portion of FIG. 1. FIG. 2B is a view of a frequency spectrum of the PSK-modulated signal output by the PSK modulator 202 in FIG. 1. In FIG. 2A, Td is the period of the transmitted signal d(t). The frequency band width Bd is given as Bd=1/Td FIG. 3A is a view of a typical change in the spread signal p(t) from the PN generator 205. FIG. 3B is a view of a frequency spectrum of the spread spectrum signal output by the spread spectrum modulator 204. In FIG. 3A, Tp is the period of the spread signal p(t). As shown in FIGS. 3A and 3B, the period Tp of the spread signal p(t) changes last over short time with respect to the period Td of the transmitted signal d(t). This causes the spread spectrum modulator 204 to spread the frequency spectrum over a wide band (frequency band width Bp=1/Tp).

FIG. 4 is a block diagram of a demodulating portion of a receiver for use with the direct spread spectrum communication system of FIG. 1. In FIG. 4, the spread spectrum signal received by an antenna of the like, not shown, and admitted through a terminal 211 enters a band-pass filter (BPF) 212. The band-pass filter 212 retains only those components of the signal which constitute the necessary band and discards the rest.

Past the band-pass filter 212, the spread spectrum signal goes into a reverse spread device 213 illustratively made of a multiplier. For its reverse spread operation, the reverse spread device 213 is fed by a PN (pseudo noise) generator 214 with a signal p(t)' identical to the above-mentioned spread signal p(t). In this case, the signal p(t)' from the PN generator 214 is so controlled as to coincide in phase with the spread signal p(t). That is, the relation $p(t) \cdot p(t)' = p(t)^2 = 1$ should hold.

The output signal from the reverse spread device 213 goes to a band-pass filter 215 whose center frequency is fc and whose passing band is 2Bd. The band-pass filter 215 extracts a PSK-modulated signal from the signal received. The PSK-modulated signal is supplied to and demodulated by a PSK demodulator 216. As a result, the original signal d(t) is tapped from an output terminal 217. Spread spectrum communication, as outlined, is a communication method whereby a frequency spectrum is spread over a wide band for communications that ensure security and privacy with high immunity to interference.

To keep the spread spectrum communication system normally operational requires conventionally that the receiving power of the base station remain constant over the communication channels connected to subordinate mobile stations. It is thus necessary to keep constant the transmitting power of each mobile station as it communicates with the base station while moving under varying external conditions. Theoretical calculations put the precision of transmitting power control to within 0.5 dB in the vicinity of the upper limit of the system's circuit capacity. In practice, that kind of precision is difficult to achieve. This has been a major problem with spread spectrum communication systems based on CDMA (code division multiple access).

FIG. 5A is a view of a frequency spectrum of the signal sent from the input terminal 211 to the band-pass filter 212 in FIG. 4. FIG. 5B is a view of a frequency spectrum of the signal sent from the reverse spread device 213 to the band-pass filter 215 in FIG. 4. FIG. 5C is a view of a frequency spectrum of the signal sent from the band-pass filter 215 to the PSK demodulator 216 in FIG. 4. In FIG. 5A, the spread spectrum signal with a band width of 2Bp mixes with a narrow band interference component. If the power of the signal in FIG. 5A is denoted by Pr and that of the interference wave by $P_I$, the signal-to-interference wave power ratio $(S/I)_A$ is given as $(S/I)_A = Pr/P_I$ In FIG. 5B, a reverse relationship of what is given in FIG. 5A holds. That is, the signal passes through the band-pass filter 215 having a band width of 2Bd. The result is shown in FIG. 5C. In this case, the signal-to-interference wave power ratio $(S/I)_C$ is given as $$(S/I)_c = (P_r/P_I)(B_p/B_d)$$
$$= (S/I)_A(B_p/B_d)$$
$$= (S/I)_A G$$

where, G stands for a process gain ($G=B_p/B_d$). As indicated, subjecting the input signal to spread spectrum modulation improves the signal-to-interference wave power ratio From $(S/I)_A$ to $(S/I)_C$, i.e., by the amount of G. Thus the spread spectrum communication scheme enhances the immunity to the adverse effects of interference signal components.

Consider the case where white noise is involved, with no narrow band interference signal component present. In this case, as above, the spectrum patterns of the respective signals in FIG. 4 appear as depicted in FIGS. 6A, 6B and 6C. The signal-to-noise ratio $(S/N)_A$ of the signal FIG. 6A is given as $$(S/N)_A = P_r/(N_o \cdot 2B_p)$$

where, No is the power of the white noise signal component. Likewise, the signal-to-noise ratio $(S/N)_C$ of the signal in FIG. 6C is given as $$(S/N)_A = P_r/(N_o \cdot 2B_d)$$
$$= (S/N)_A(B_p/B_d)$$
$$= (S/N)_A G$$

The case above thus yields the same result as that of the case where the narrow band interference signal component is involved as depicted in FIG. 5.

In the case of communication within one system whose terminals utilize the same PN code, a given terminal regards the communication done by any other terminal as a noise similar to the white noise. That is, when one terminal transmits its signal at a raised power level, the terminal not only dissipates more power than before but also interferes with the communication of other terminals. Communication carried out under schemes other than the spread spectrum communication constitutes a component approximating the narrow band interference signal component. In any case, higher levels of traffic lead to the increase in the noise indicated by the shaded portions in FIGS. 5C and 6C. This is a significant impediment to the normal execution of communication.

One prior art solution to the above impediment is to enlarge the band width Bp off the spread spectrum signal so as to increase the process gain G. This requires boosting the clock rate for reverse spread operation through multiplication of the spread signal p(t)' in FIG. 4. The solution results in more power dissipation of which the level turns out to be disproportionately high where the process gain G need not be very high.

SUMMARY OF THE INVENTION

It is therefore an object of the present invention to provide a spread spectrum communication system and a transmitter-receiver which offer improved S/N ratios where traffic is high or transmission quality is low, and which save power where traffic is low or transmission quality is high.

It is another object of the invention to provide a spread spectrum communication system and a transmitter-receiver which ensure large margins of power control precision for mobile stations in the vicinity of the upper limit of the system's line capacity.

It is a further object of the invention to provide a spread spectrum communication system and a transmitter-receiver which keep the transmitting power involved at appropriate levels.

In carrying out the invention and according to a first aspect thereof, there is provided a spread spectrum communication system for performing spread spectrum communication by superimposing a pseudo noise signal on a transmitted signal, the spread spectrum communication system comprising: traffic detecting means for detecting the traffic of the transmitted signal; and means for changing the clock frequency of the pseudo noise signal in accordance with the output from the traffic detecting means.

According to a second aspect of the invention, there is provided a spread spectrum communication system for performing spread spectrum communication by superimposing a pseudo noise signal on a transmitted signal, the spread spectrum communication system comprising: transmission quality determining means for determining the transmission quality of a received signal; and means for changing the clock frequency of the pseudo noise signal in accordance with the transmission quality determined by the transmission quality determining means.

According to a third aspect of the invention, there is provided a spread spectrum transmitter-receiver for superimposing a pseudo noise signal on a transmitted signal and for receiving the transmitted signal containing the superimposed pseudo noise signal, the spread spectrum transmitter-receiver comprising: transmission quality determining means for determining the transmission quality of a received signal; means for controlling the clock rate of the pseudo noise signal in accordance with the transmission quality determined by the transmission quality determining means; and means for combining information about the changed clock rate with the transmitted signal.

According to a fourth aspect of the invention, there is provided a spread spectrum transmitter-receiver for superimposing a pseudo noise signal on a transmitted signal and for receiving the transmitted signal containing the superimposed pseudo noise signal, the spread spectrum transmitter-receiver comprising: traffic detecting means for detecting the traffic of the transmitted signal; means for controlling the clock rate of the pseudo noise signal in accordance with the output from the traffic detecting means; and means for combining information about the changed clock rate with the transmitted signal.

According to a fifth aspect of the invention, there is provided a spread spectrum transmitter-receiver comprising: transmission quality determining means for determining the quality of a received signal from the other spread spectrum transmitter-receiver; control data generating means for generating clock control data for controlling the clock rate of a pseudo noise signal from the other spread spectrum transmitter-receiver in accordance with the transmission quality determined by the transmission quality determining means; data combining means for combining with a transmitted signal the clock control data generated by the control data generating means; and a band-pass filter circuit for controlling a passing band in accordance with the changed clock rate of the pseudo noise signal in the received signal from the other spread spectrum transmitter-receiver.

According to a sixth aspect of the invention, there is provided a spread spectrum transmitter-receiver comprising: traffic detecting means for detecting the traffic of a received signal from the other spread spectrum transmitter-receiver; control data generating means for generating clock control data for controlling the clock rate of a pseudo noise signal from the other spread spectrum transmitter-receiver in accordance with the output from the traffic detecting means; data combining means for combining with a transmitted signal the clock control data generated by the control data generating means; and a band-pass filter circuit for controlling a passing band in accordance with the changed clock rate of the pseudo noise signal in the received signal from the other spread spectrum transmitter-receiver.

According to a seventh aspect of the invention, there is provided a spread spectrum transmitter-receiver system comprising: a second spread spectrum transmitter-receiver having transmission quality determining means for determining the transmission quality of a received signal from a first spread spectrum transmitter-receiver, control data generating means for generating clock control data for controlling the clock rate of a pseudo noise signal from the first spread spectrum transmitter-receiver in accordance with the transmission quality determined by the transmission quality determining means, and data combining means for combining with a transmitted signal the clock control data generated by the control data generating means; and the first spread spectrum transmitter-receiver having data extracting means for extracting the clock control data from a received signal from the second spread spectrum transmitter-receiver, and clock control means for controlling the clock rate of the pseudo noise signal in accordance with the clock control data extracted by the data extracting means.

According to an eighth aspect of the invention, there is provided a spread spectrum transmitter-receiver system comprising: a second spread spectrum transmitter-receiver having traffic detecting means for detecting the traffic of a received signal from a first spread spectrum transmitter-receiver, control data generating means for generating clock control data for controlling the clock rate of a pseudo noise signal from the first spread spectrum transmitter-receiver in accordance with the output from the traffic detecting means, and data combining means for combining with a transmitted signal the clock control data generated by the control data generating means; and the first spread spectrum transmitter-receiver having data extracting means for extracting the clock control data from a received signal from the second spread spectrum transmitter-receiver, and clock control means for controlling the clock rate of the pseudo noise signal in accordance with the clock control data extracted by the data extracting means.

According to a ninth aspect of the invention, there is provided a spread spectrum communication system for performing spread spectrum communication by superimposing a pseudo noise signal on a transmitted signal, the spread spectrum communication system comprising: traffic detecting means for detecting the traffic of the transmitted signal; and means for changing the clock frequency of the transmitted signal in accordance with the output from the traffic detecting means.

According to a tenth aspect of the invention, there is provided a spread spectrum communication system for performing spread spectrum communication by superimposing a pseudo noise signal on a transmitted signal, the spread spectrum communication system comprising: transmission quality determining means for determining the transmission quality of a received signal; and means for changing the clock frequency of the transmitted signal in accordance with the transmission quality determined by the transmission quality determining means.

According to an eleventh aspect of the invention, there is provided a spread spectrum transmitter-receiver for super-imposing a pseudo noise signal on a transmitted signal and for receiving the transmitted signal containing the superimposed pseudo noise signal, the spread spectrum transmitter-receiver comprising: transmission quality determining means for determining the transmission quality of a received signal; means for controlling the clock rate of the transmitted signal in accordance with the transmission quality determined by the transmission quality determining means; and means for combining information about the changed clock rate with the transmitted signal.

According to a twelfth aspect of the invention, there is provided a spread spectrum transmitter-receiver for superimposing a pseudo noise signal on a transmitted signal and for receiving the transmitted signal containing the superimposed pseudo noise signal, the spread spectrum transmitter-receiver comprising: traffic detecting means for detecting the traffic of the transmitted signal; means for controlling the clock rate of the transmitted signal in accordance with the output from the traffic detecting means; and means for combining information about the changed clock rate with the transmitted signal.

According to a thirteenth aspect of the invention, there is provided a spread spectrum transmitter-receiver system comprising: a first spread spectrum transmitter-receiver having transmission quality determining means for determining the transmission quality of a received signal, control data generating means for generating clock control data for controlling the clock rate of a transmitted signal in accordance with the transmission quality determined by the transmission quality determining means, and data combining means for combining with the transmitted signal the clock control data generated by the control data generating means; and a second spread spectrum transmitter-receiver having data extracting means for extracting the clock control data from the received signal, and clock control means for controlling the clock rate of the transmitted signal in accordance with the clock control data extracted by the data extracting means.

According to a fourteenth aspect of the invention, there is provided a transmitter-receiver comprising: loss estimating means for estimating losses over a propagation path in accordance with a received signal; and power control means for controlling transmitting power in accordance with the result of estimation by the loss estimating means.

The above and other objects, features and advantages of the present invention and the manner of realizing them will become more apparent, and the invention itself will best be understood from a study of the following description and appended claims with reference to the attached drawings showing some preferred embodiments of the invention.

BRIEF DESCRIPTION OF THE DRAWINGS

FIG. 15A is a view showing a relationship between clock rates and process gain in connection with the second embodiment;

FIG. 15B is a view showing another relationship between clock rates and process gain in connection with the second embodiment;

DETAILED DESCRIPTION OF THE PREFERRED EMBODIMENTS

Figure 1:
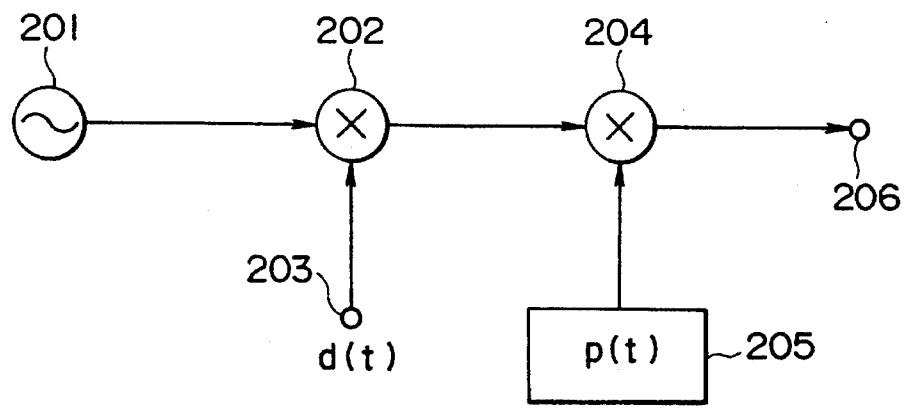
FIG. 1 is a block diagram of a modulating portion in a transmitter for use with a conventional direct spread spectrum communication system.
Figure 2A:
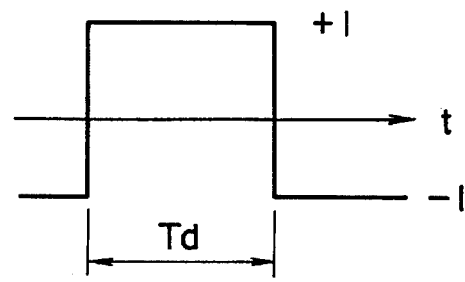
FIG. 2A is a view of a typical change in a transmitted signal used by the modulation portion of FIG. 1.
Figure 2B:
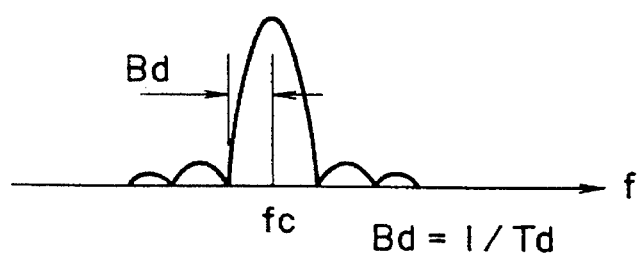
FIG. 2B is a view of a frequency spectrum of a PSK-modulated signal output by a PSK modulator in the setup of FIG. 1.
Figure 3A:
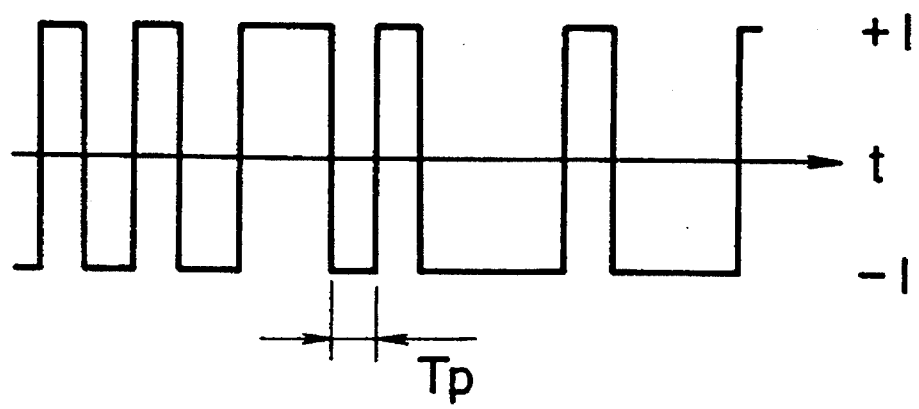
FIG. 3A is a view of a typical change in a spread signal from a PN generator in the setup of FIG. 1.
Figure 3B:
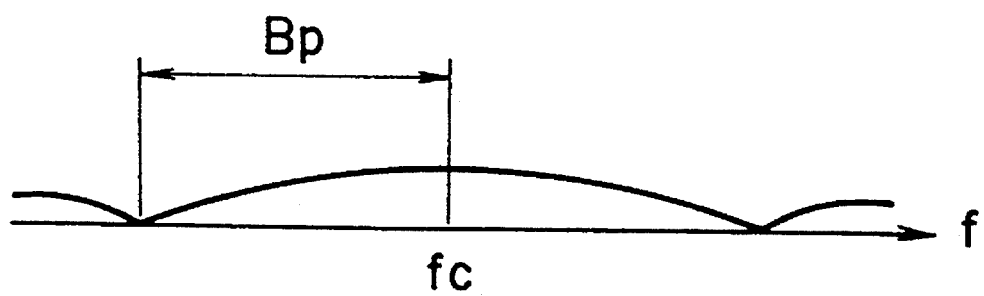
FIG. 3B is a view of a frequency spectrum of a spread spectrum signal output by a spread spectrum modulator in the setup of FIG. 1.
Figure 4:
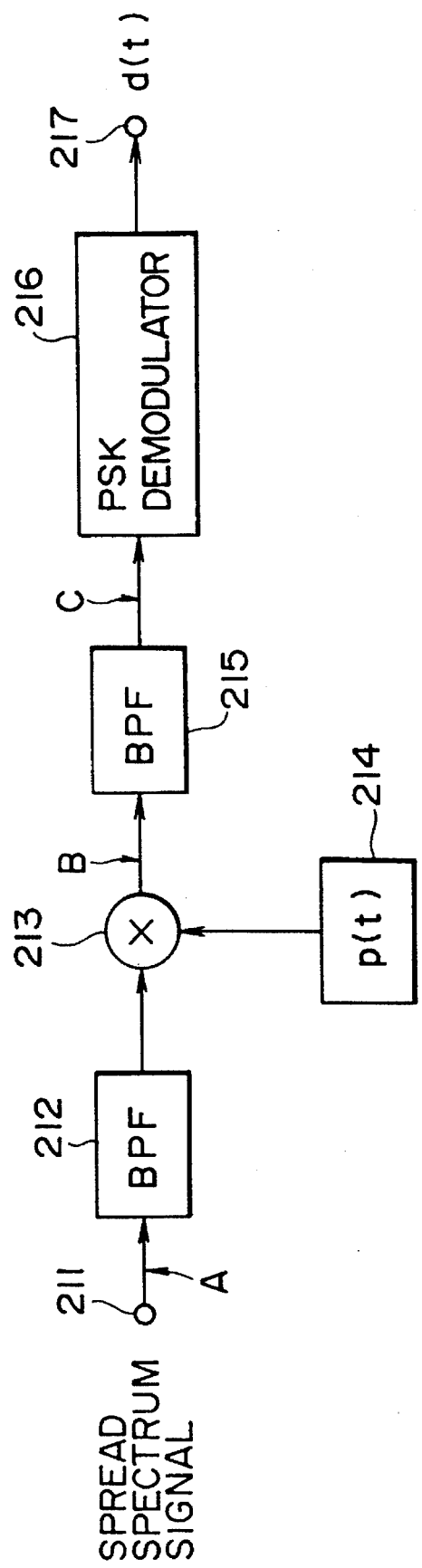
FIG. 4 is a block diagram of a demodulating portion of a receiver for use with the direct spread spectrum communication system of FIG. 1.
Figure 5A:
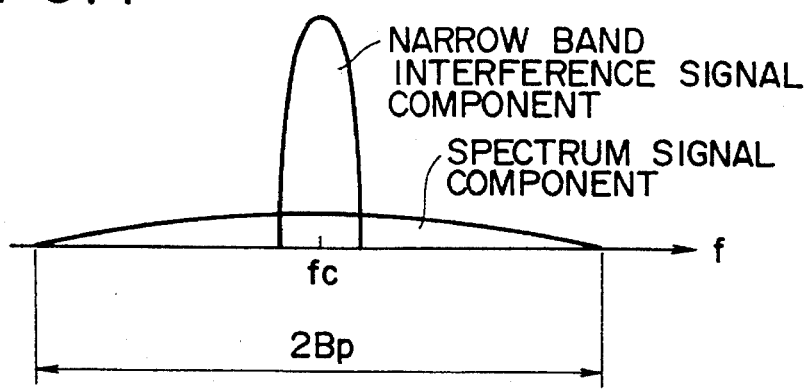
FIG. 5A is a view of a frequency spectrum of a signal used in the setup of FIG 4.
Figure 5B:
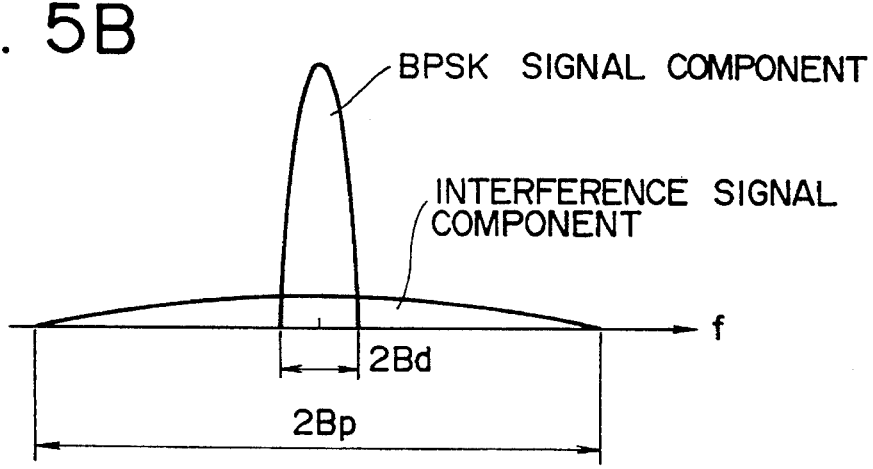
FIG. 5B is a view of a frequency spectrum of anther signal used in the setup of FIG. 4.
Figure 5C:
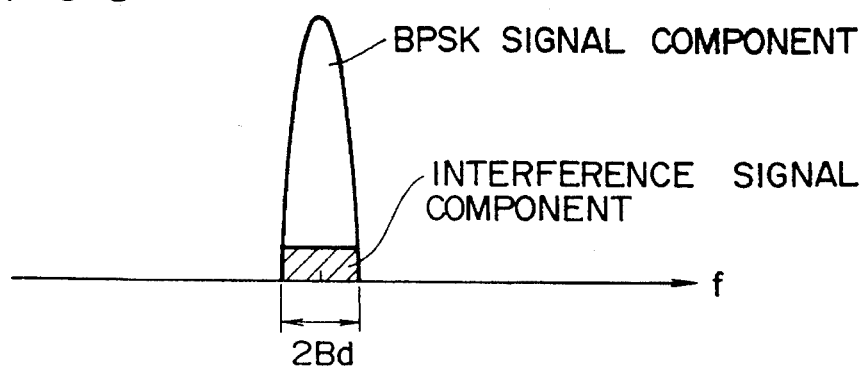
FIG. 5C is a view of a frequency spectrum of another signal used in the setup of FIG. 4.
Figure 6A:
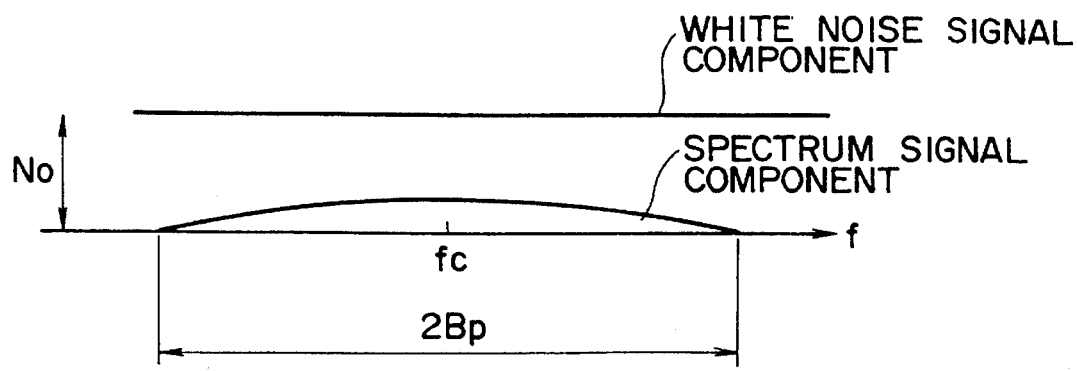
FIG. 6A is a view of a frequency spectrum of another signal used in the setup of FIG. 4.
Figure 6B:
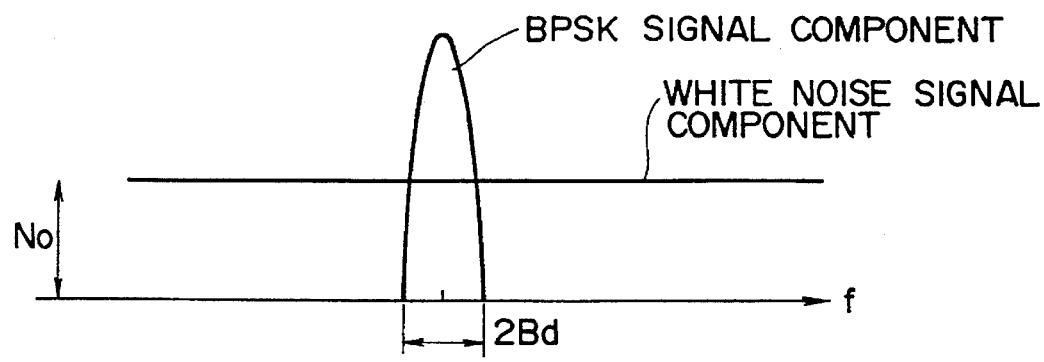
FIG. 6B is a view of a frequency spectrum of another signal used in the setup of FIG. 4.
Figure 6C:
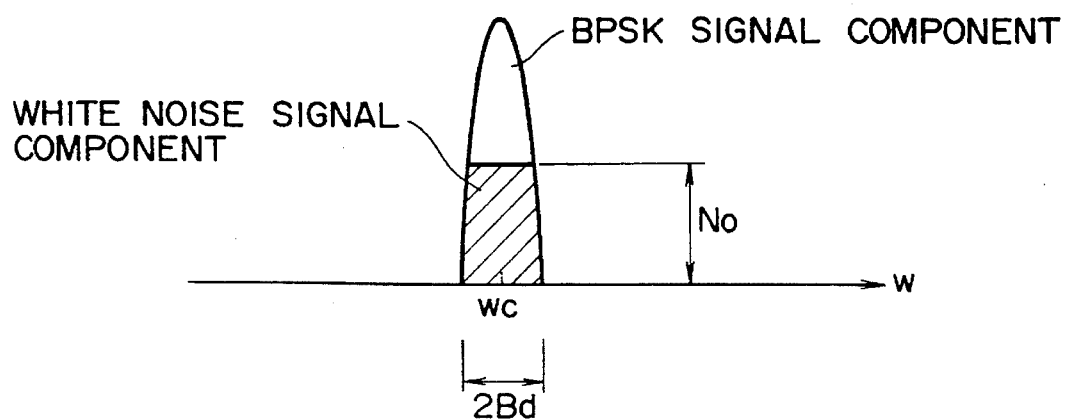
FIG. 6C is a view of a frequency spectrum of another signal used in the setup of FIG. 4.
Figure 7:
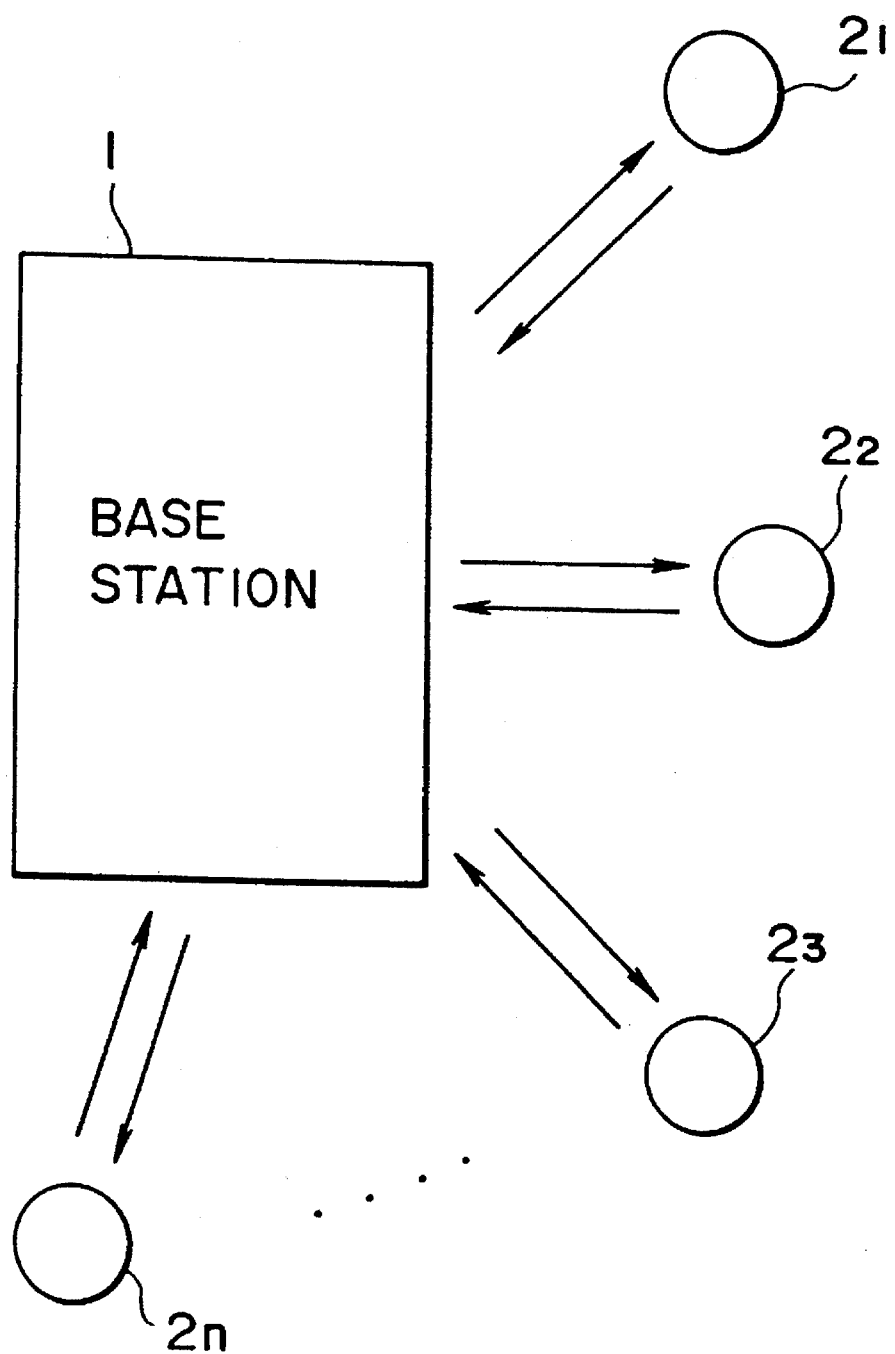
FIG. 7 is a block diagram of a spread spectrum communication system practiced as a first embodiment of the invention.

FIG. 7 is a block diagram of a spread spectrum communication system practiced as the first embodiment of the invention. The figure schematically illustrates the basic concept of the first embodiment. It is assumed that the first embodiment performs spread spectrum communication using the same pseudo noise (PN) code sequence as that used by the prior art example.

In FIG. 7 a base station 1 of the spread spectrum communication system is connected to a plurality (n) of terminals $2_1, 2_2, \ldots, 2n$. The base station 1 monitors the amount of its traffic to and from each terminal while communicating therewith. When the number of communicating terminals exceeds a predetermined threshold value, the process gain G is increased, i.e., the band width of the spread spectrum signal is widened in order to improve the S/N ratio. Conversely, if the number of communicating terminals drops below a predetermined threshold value, the band width of the spread spectrum signal is reduced to the narrowest possible width that permits communication. This lowers the clock rate for reverse spread operation and thereby saves power.

Figure 8A:
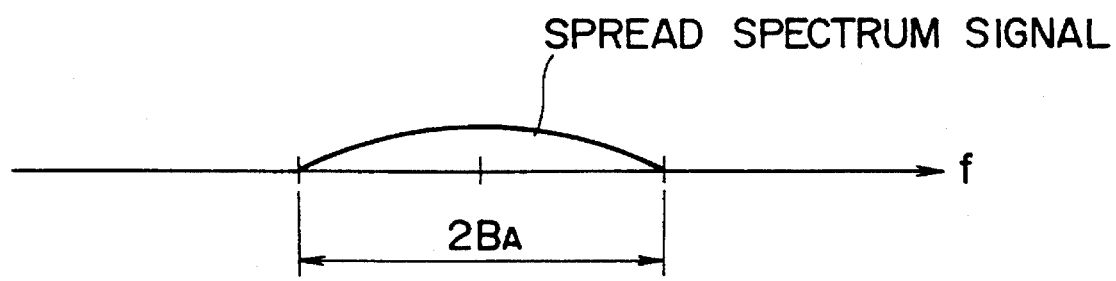
FIG. 8A is a view of a spectrum distribution pattern of a spread spectrum signal used by the first embodiment wherein the amount of traffic is normal.
Figure 8B:
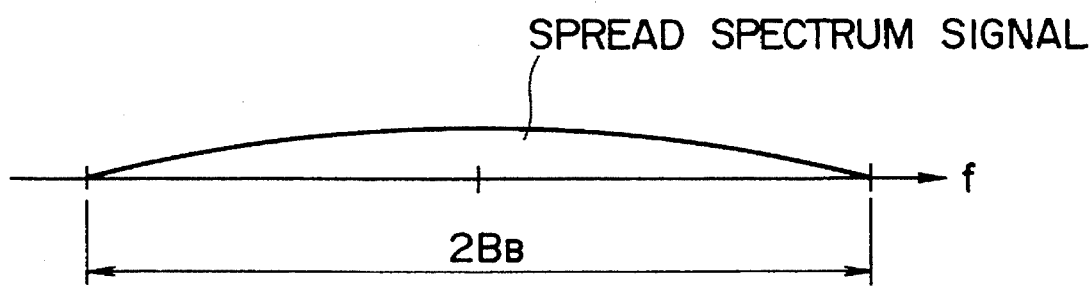
FIG. 8B is a view of a spectrum distribution pattern of the spread spectrum signal used by the first embodiment wherein the number of communicating terminals is large.
Figure 8C:
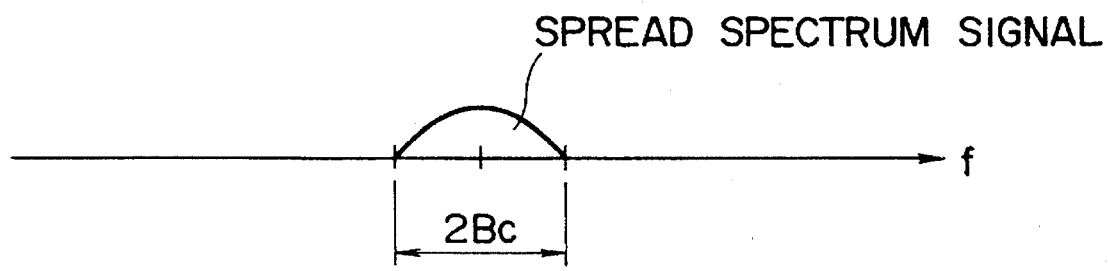
FIG. 8C is a view of a spectrum distribution pattern of the spread spectrum signal used by the first embodiment wherein the number of communicating terminals is small.

FIG. 8A is a view of a spectrum distribution pattern of the spread spectrum signal used by the first embodiment wherein the amount of traffic is normal. The band width in this case is $2B_A$. FIG. 8B shows a spectrum distribution pattern of the spread spectrum signal used by the first embodiment wherein the number of communicating terminals is large. The band width in this case is $2B_B$. FIG. 8C depicts a spectrum distribution pattern of the spread spectrum signal used by the first embodiment wherein the number of communicating terminals is small. The band width in this case is $2B_C$. The relationship among these band widths is defined as $B_B > B_A > B_C$ The first embodiment may take on a case in which the base station detects the S/N ratio of the signal from each terminal within the same system and finds the overall ratio to have deteriorated. In that case, the base station may assume that a narrow band interference signal has increased due to a rise in the traffic of a totally different system, and may change the band width of the spread spectrum signal accordingly. For example, the climb in the mobile phone traffic in the morning and evening cause higher noise levels. When the increased noise is detected, the band width of the spread spectrum signal is widened and the process gain G is raised to prevent S/N ratio deterioration.

In any of the above cases where the band width of the spread spectrum signal is changed, the base station instructs its terminals when to change the band width, with what timing, and how much. In turn, the terminal station side is required to provide any one of a plurality of appropriate clock rates for reverse spread operation on the spread spectrum signal with its band width changed. The multiple clock rates may be generated in a number of ways, e.g., by division of a reference clock rate or by switching of a plurality of oscillators.

Figure 9:
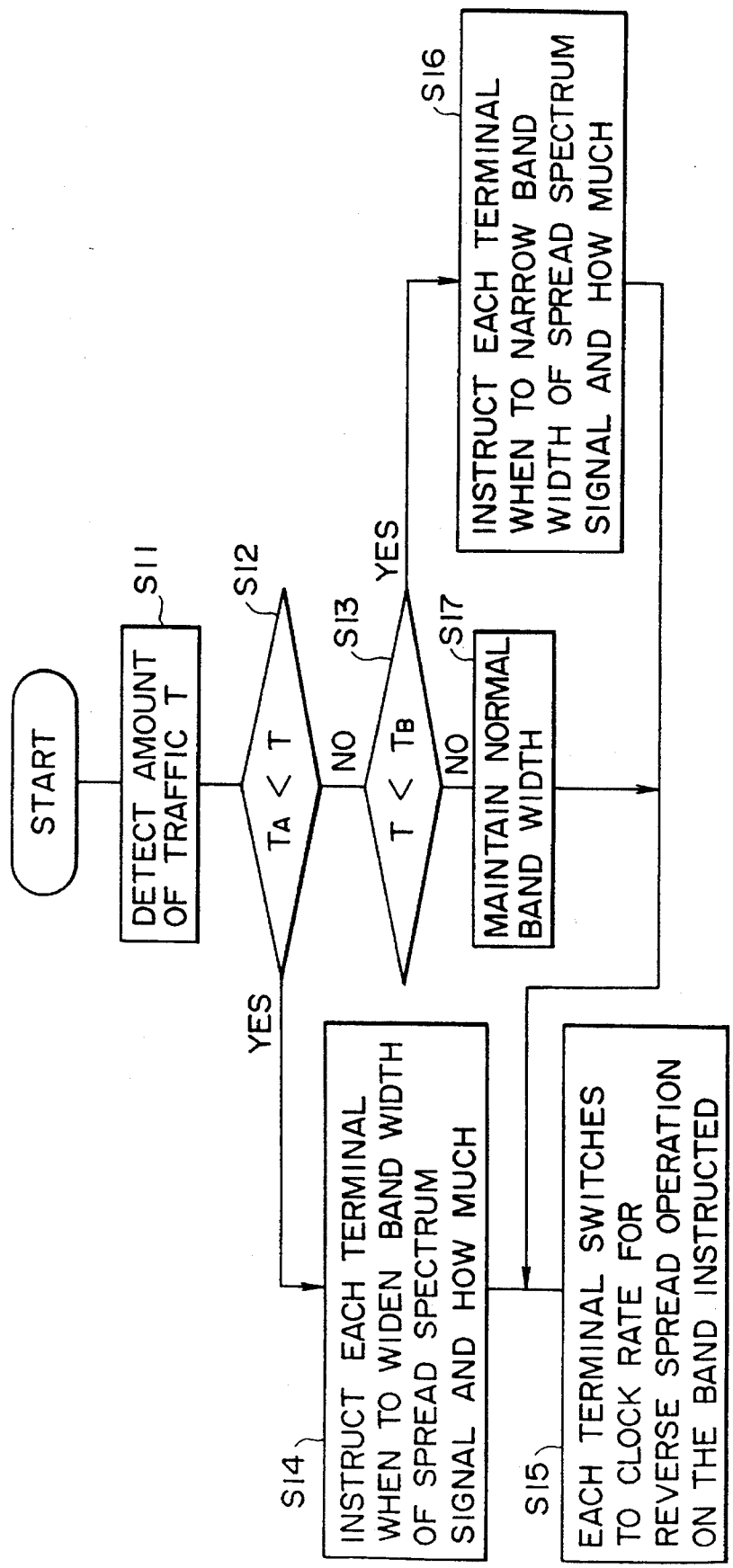
FIG. 9 is a flowchart of steps in which the band width of the spread spectrum signal and the clock rate are changed according to the amount of traffic in conjunction with the first embodiment.
Figure 10:
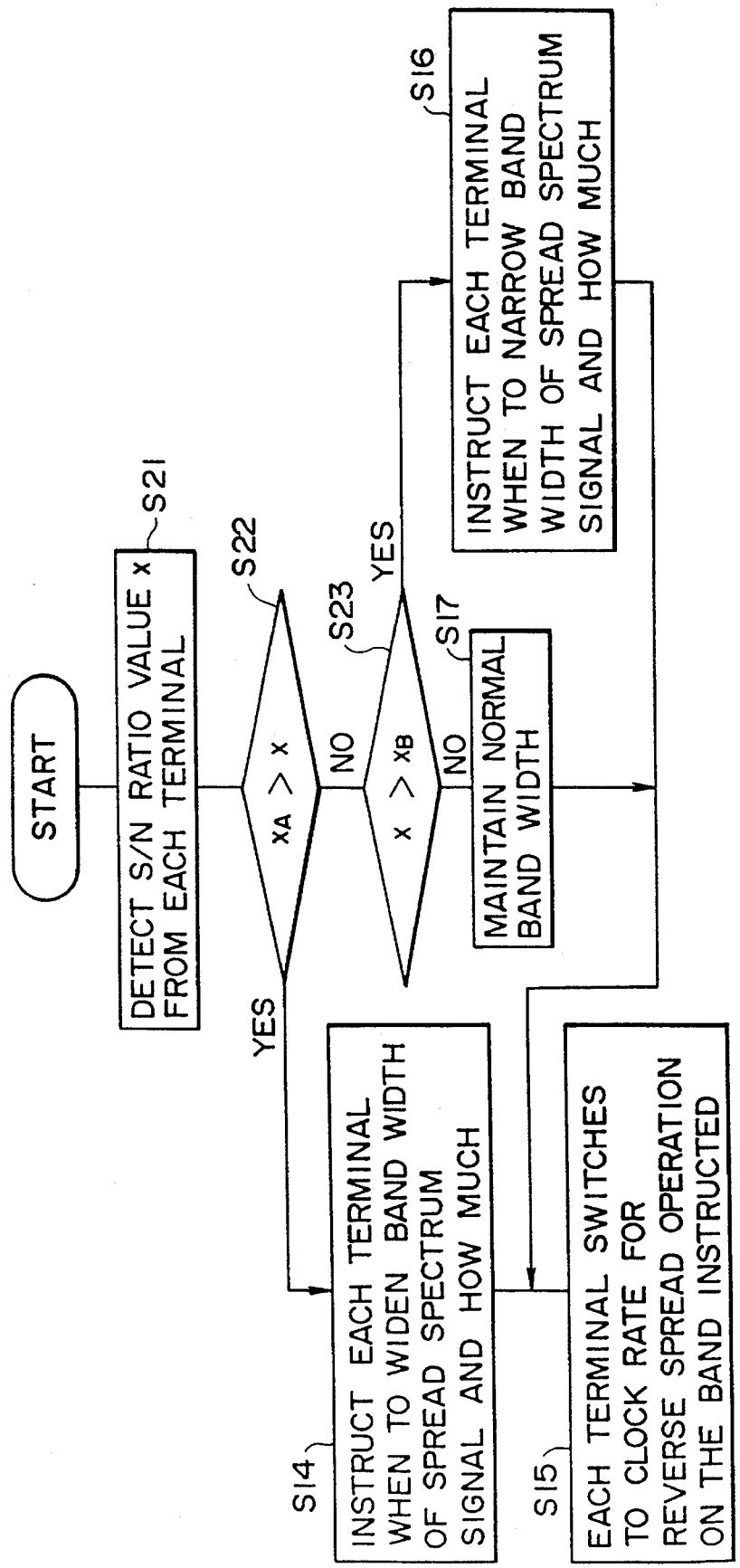
FIG. 10 is a flowchart of steps in which the band width of the spread spectrum signal and the clock rate are changed according to the S/N ratio of each terminal in conjunction with the first embodiment.

FIG. 9 is a flowchart of steps in which the band width of the spread spectrum signal and the clock rate are changed according to the amount of traffic in connection with the first embodiment, and FIG. 10 is a flowchart of steps in which the band width of the spread spectrum signal and the clock rate are changed according to the S/N ratio of each terminal in conjunction with the first embodiment. Referring to FIG. 9, the base station detects the current amount of traffic T in step S11. In step S12, the base station determines if the amount of traffic T is greater than a predetermined threshold value $T_A$. If the amount of traffic T is found to be greater than the threshold value $T_A$, step S14 is reached; otherwise step S13 is reached. In step S14, the base station instructs each terminal when to widen the band width and how much. More specifically, the base station transmits to each terminal a signal containing band width change instruction data. In turn, each terminal in step S15 follows the instruction from the base station and switches to an appropriate clock rate that permits reverse spread operation on the instructed band width.

In step S13, the base station checks to see if the currently detected amount of traffic T is lower than another predetermined threshold value $T_B$ ($T<T_B$, where $T_B<T_A$). If the amount of traffic T is found to be lower than the threshold value $T_B$, step S16 is reached. In step S16, the base station instructs each terminal when to narrow the band width of the spread spectrum signal and how much. Step S16 is followed by step S15 in which each terminal switches to an appropriate clock rate as instructed by the base station. If the amount of traffic T is found to be equal to or greater than the threshold value $T_B$, that means the amount of traffic T falls somewhere between the two threshold value $T_A$ and $T_B$ ($T_B \leq T \leq T_A$). In that case, step S13 is followed by step S17 where the normal band width is maintained. If the terminal station side at this point runs on a clock rate commensurate with a widened or narrowed band width, the clock rate corresponding to the normal band width is now restored.

Alternatively, the S/N ratio of each terminal may be monitored for the purpose of changing the band width of the spread spectrum signal and the clock rate in connection with the first embodiment, as indicated in the flowchart of FIG. 10. While steps S14 through S17 in FIG. 10 are the same as in FIG. 9, steps S21 through S23 of FIG. 10 differ. Only the different steps will be explained.

Referring to FIG. 10, the base station detects the S/N ratio x of the signal from each terminal in step S21. The base station checks to see if the value x is smaller than a first threshold value $x_A$ in step S22 and if the value x is larger than a second threshold value $X_B$ in step S23. If the value x is found to be smaller than the first threshold value $x_A$ in step S22, step S14 is reached; otherwise step S23 is reached. If the value x is found to be larger than the second threshold value $x_B$ in step S23, step S16 is reached; otherwise step S17 is reached.

Figure 11:
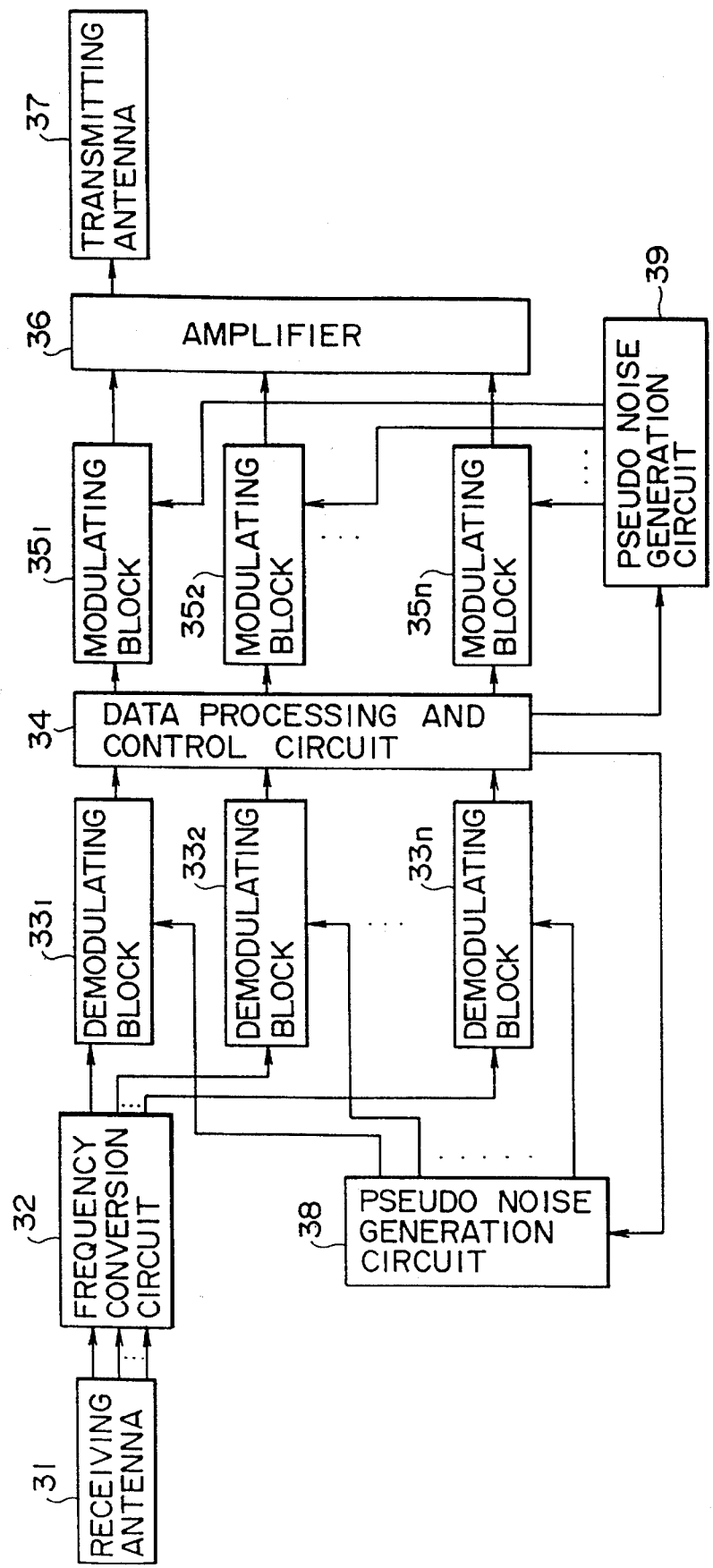
FIG. 11 is a block diagram of a base station constituting part of the first embodiment.
Figure 12:
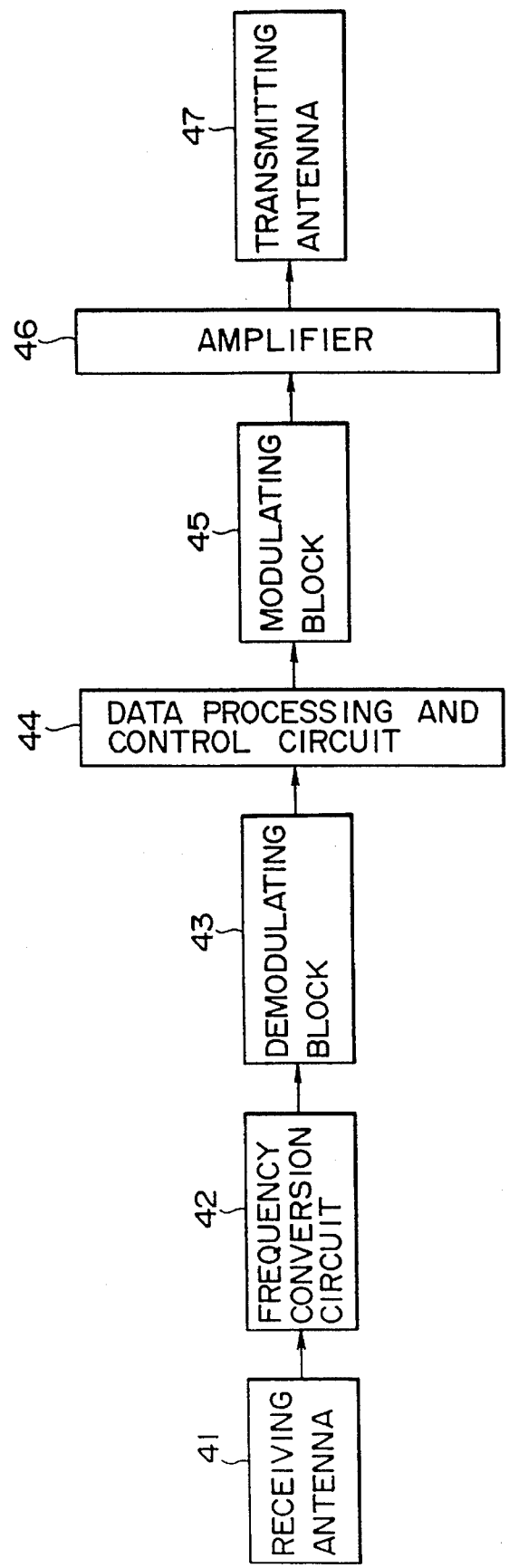
FIG. 12 is a block diagram of a terminal constituting part of the first embodiment.

FIG. 11 is a block diagram of atypical base station constituting part of the first embodiment, and FIG. 12 is a block diagram of a typical terminal also constituting part of the first embodiment. At the base station side, as shown in FIG. 11, a transmitted signal from each terminal is received by a receiving antenna 31. The received signal, which is a radio frequency (RF) signal, is forwarded to a frequency conversion circuit 32 for conversion to an intermediate frequency (IF) signal. If the base station is a digital processing setup, the frequency conversion circuit 32 also performs A/D conversion. The converted signal is sent to a plurality of demodulating blocks $33_1$, $33_2$, . . . , 33n. The number of the demodulating blocks in the base station varies with the expected amount of traffic. Each of the demodulating blocks $33_1$, $33_2$, . . . , 33n performs reverse spread operation using the PN code sequence from a pseudo noise (PN) generation circuit 38 and then carries-out data demodulation. If the transmitted data are in coded format, they are decoded by the demodulating blocks. The demodulated data are forwarded to a data processing and control circuit 34 (e.g., base band processor). The data processing and control circuit 34 processes the data received, controls data transmission and reception, and controls the switching to an appropriate clock rate for the pseudo noise (PN).

The base station transmits data to each of its terminals as follows: The data processing and control circuit 34 sends necessary data to modulating blocks $35_1$, $35_2$, . . . , 35n for modulation and coding. The modulating blocks modulate and code the data received before subjecting them to spread spectrum processing using the PN code from a pseudo noise (PN) generation circuit 39. The processed data signal is converted through amplification by a high-power amplifier 36 to a transmission output signal. The amplified signal is broadcast by radio from a transmitting antenna 47 to each of the terminals. With this embodiment, the base station has its data processing and control circuit 34 monitor the amount of traffic T illustratively by counting the number of active circuits in the demodulating blocks $33_1$, $33_2$, etc. Then the clock rate of the pseudo noise (PN) code sequence is changed as needed for reverse spread operation by the demodulating blocks $33_1$, $33_2$, etc. or for spread spectrum operation by the modulating blocks $35_1$, $35_2$, etc.

Where the S/N ratio of the signal from each terminal is monitored for clock rate control, the demodulating blocks $33_1$, $33_2$, etc. initially detect the S/N ratio of the signal received. The detected signal is sent to the data processing and control circuit 34 (e.g., base band processor). Based on the signal it received, the circuit 34 changes the clock rate of the PN code for reverse spread operation or for spread spectrum operation.

Similar processing also takes place on the terminal station side, as illustrated in FIG. 12. Referring to FIG. 12, a radio frequency (RE) signal received by a receiving antenna 41 is forwarded to a frequency conversion circuit 42 for conversion to an intermediate frequency (IF) signal. A demodulating block 43 demodulates the signal received from the circuit 42 and carries out reverse spread operation using the PN code The processed signal is fed to a data processing and control circuit 44 (e.g., base band processor) for data processing and control over transmission and reception. The data from the circuit 44 is sent to a modulating block 45 for modulation and PN coding. The output of the modulating block 45 is converted (i.e., amplified) by a high-power amplifier 46 into a signal ready for transmission. This signal is transmitted via a transmitting antenna 47 to the base station. At the terminal station side, the data processing and control circuit 44 changes the clock rate of the PN code for the reverse spread operation by the demodulating block 43 and for the spread spectrum operation by the modulating block 45 in accordance with the clock changeover instruction signal from the base station.

Figure 13:
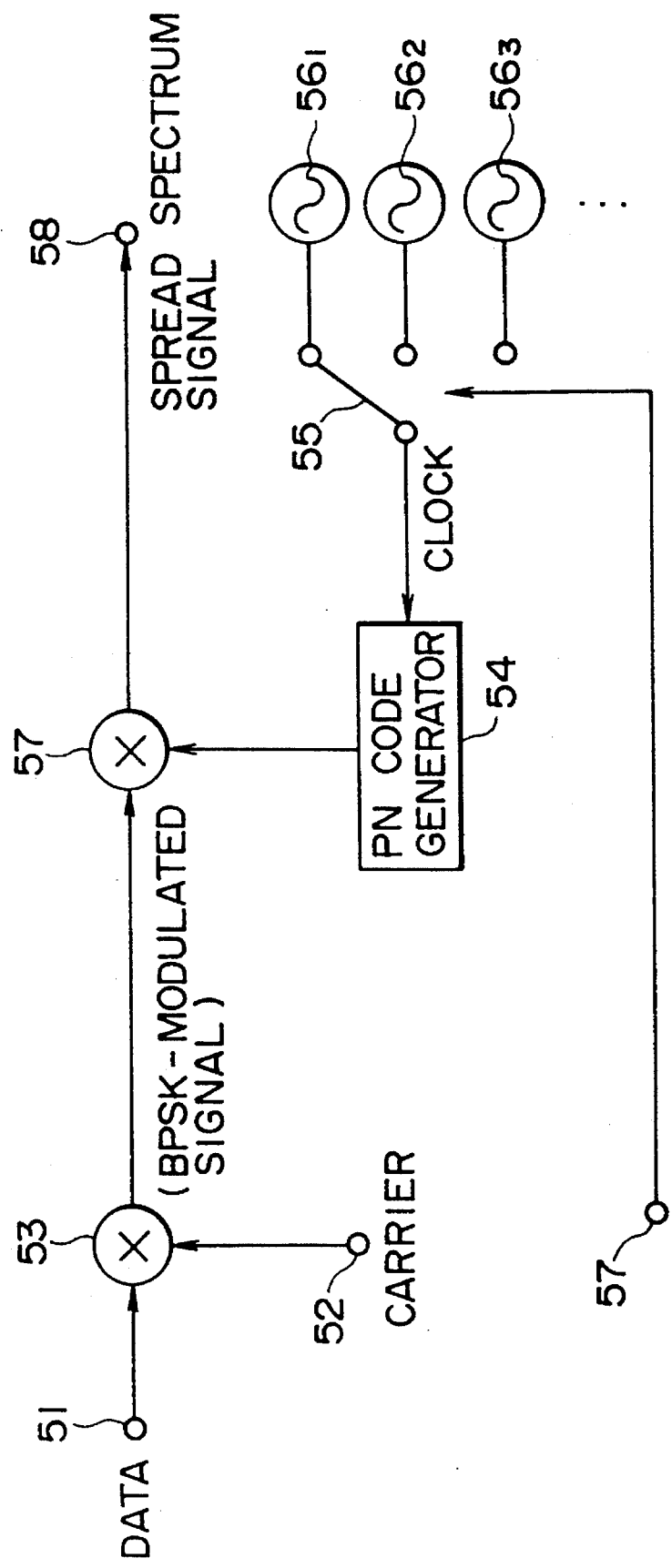
FIG. 13 is a block diagram of a typical modulator contained in the first embodiment.

FIG. 13 is a block diagram of a typical modulator representative of the modulating blocks $35_1$, $35_2$, etc. and 45. In the setup of FIG. 13, incoming data are subjected to BPSK (bi-phase shift keying) before being converted to a spread spectrum signal.

Referring to FIG. 13, incoming data from the data processing and control circuit 34 (or 44) are sent to a multiplier 53 via an input terminal 51. The multiplier 53 multiplies the data by a carrier signal from another input terminal 52 to generate a BPSK-modulated signal. The BPSK-modulated signal is forwarded to a multiplier 57. In turn, the multiplier 57 multiplies the BPSK-modulated signal by the PN code generated by a PN code generator 54, thereby generating a spread spectrum signal. This signal is output from an output terminal 58. In this embodiment, the PN code generator is supplied with one of the clock signals generated by a plurality of clock generators $56_1$, $56_2$, etc. The clock signal to the PN code generator is selected by a changeover switch 55. The changeover switch 55 is controlled by the data processing and control circuit 34 detecting the amount of traffic or like parameter and sending a signal reflecting that parameter to a control terminal 59. On the terminal station side, the data processing and control circuit 44 supplies the control terminal 59 with a control signal that contains clock rate change instruction data. Needless to say, the base station and any of its terminals communicating therewith must select the same clock rate for their spread spectrum and reverse spread operations.

As described, the first embodiment controls the band width of the spread spectrum signal in accordance with the amount of traffic between the base station and its terminals. When the amount of traffic is high, deterioration of the S/N ratio is prevented; when the amount of traffic is low, power dissipation is reduced.

Figure 14:
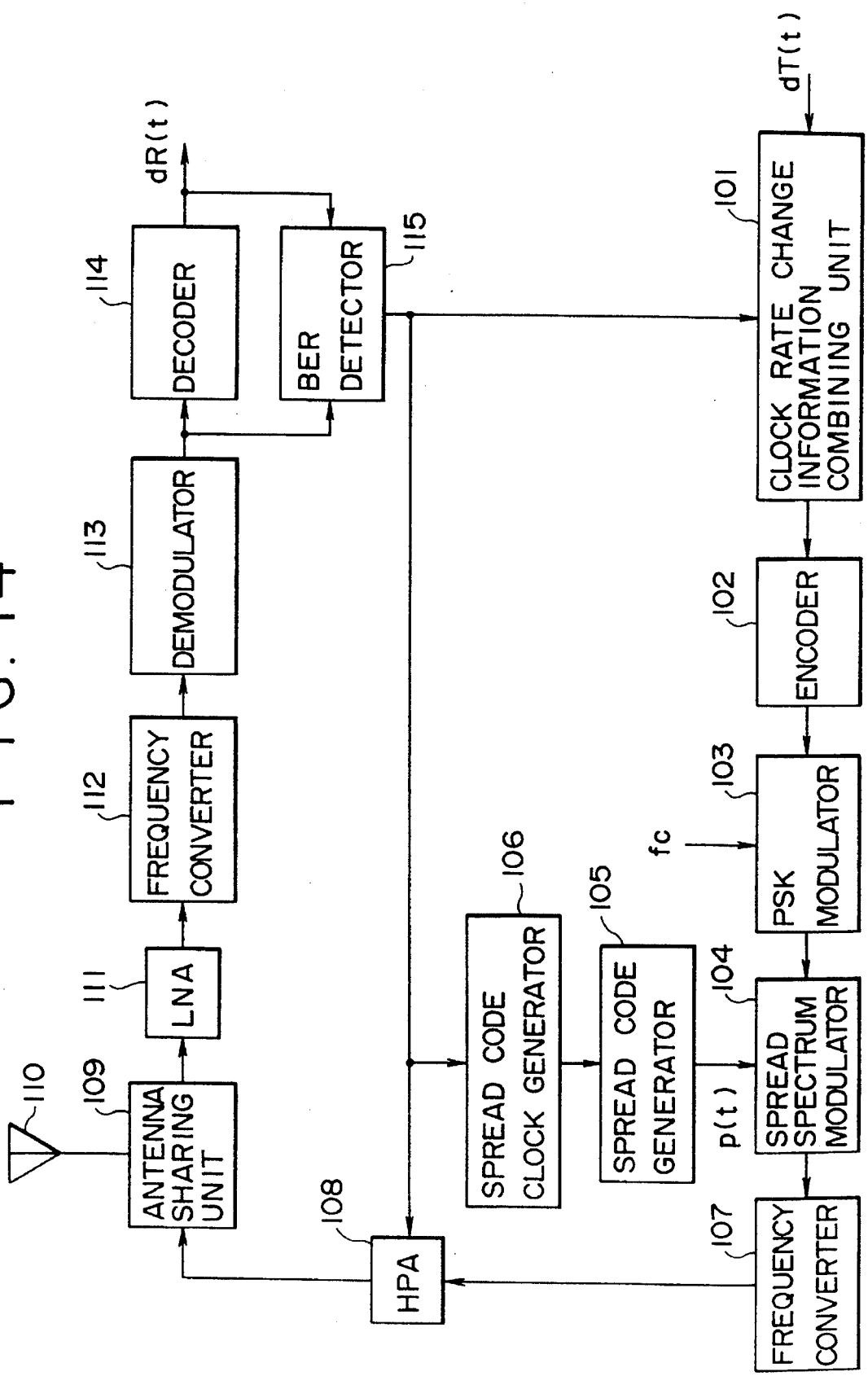
FIG. 14 is a block diagram of a mobile station practiced as a second embodiment of the invention.

FIG. 14 is a block diagram of a mobile station practiced as the second embodiment of the invention. In FIG. 14, an input terminal, not shown, of the mobile station is fed with a transmitted signal dT(t) such as a digital audio signal. The transmitted signal dT(t) is forwarded to a clock rate change information combining unit 101. When it is necessary to change the clock rate of a transmission spread code, the clock rate change information combining unit 101 combines the transmitted signal dT(t) with clock rate change information.

The signal output by the clock rate change information combining unit 101 is sent to an encoder 102 for coding in error correcting code. The coded signal from the encoder 102 is forwarded to a PSK (phase shift keying) modulator 103 which is fed with a carrier fc from a carrier generator, not shown. The PSK modulator 103 subjects the carrier fc to bi-phase shift keying (BPSK) using the signal received.

The PSK-modulated signal from the PSK modulator 103 is supplied to a spread spectrum modulator 104 which is also fed with a spread code p(t). Using the spread code p(t), the spread spectrum modulator 104 puts the PSK-modulated signal to spread spectrum modulation. The spread spectrum signal from the spread spectrum modulator 104 has its center frequency converted to a high frequency by a frequency converter 107. The resulting signal from the frequency converter 107 passes through an output (high-power) amplifier 108 and an antenna sharing unit 109. Going past the antenna sharing unit 109, the signal reaches a transmitting-receiving antenna 110 which transmits the signal to the base station.

The spread spectrum signal from the base station is received by the transmitting-receiving antenna 110. From the antenna 110, the signal-passes through the antenna sharing unit 109 and a low-noise amplifier 111 to reach a frequency converter 112. The frequency converter 112 converts the center frequency of the received signal to the operating frequency of a demodulator 113. The spread spectrum signal from the frequency converter 112 is fed to the demodulator 113 for reverse spread operation and PSK demodulation.

The signal from the demodulator 113, coded in error correcting code, is corrected for error by a decoder 114 and sent to a receiving portion downstream. The input and the output signals to and from the decoder 114 are supplied to a bit error rate (BER) detector 115 for BER calculation and evaluation. Near the upper limit of the system's line capacity, the bit error rate of the received signal from the mobile station can exceed a threshold value of about 3.0×10.

If the BER detector 115 finds that the threshold value of 3.0×10 is exceeded, the detector 115 causes the transmission spread code clock generator 106 to raise the clock rate of the spread code included in the transmitted signal.

In the second embodiment, as described, the BER detector 115 causes the transmission spread code clock generator 106 to raise the clock rate of the transmission spread code where the transmission quality of the received signal degenerates near the upper limit of the system's line capacity. With the transmission spread code clock rate increased in the vicinity of the tipper limit of the system's line capacity, the period Tp of the change in the transmission spread code p(t) is shortened and the process gain of spread spectrum processing is enhanced. This provides greater margins of power control precision FIG. 15A is a view showing a relationship between clock rates and process pain in connection with the second embodiment, and FIG. 15B is a view showing another relationship between clock rates and process gain in connection with the second embodiment. In the figures, the process gain is denoted by G, and the data rate of the transmitted signal by Bd (signal period: Td) In the case of FIG. 15A where the clock rate of the spread code is (period: $T_1$), $G=B_1/Bd$. In the case of FIG. 15B where the clock rate of the spread code is $B_2$ (period: $T_2$), $G=B_2/Bd$. Raising the spread code clock rate from $B_1$ to $B_2$ spreads the signal over a wider band width and improves the process gain by $B_2/B_1$.

Figure 16:
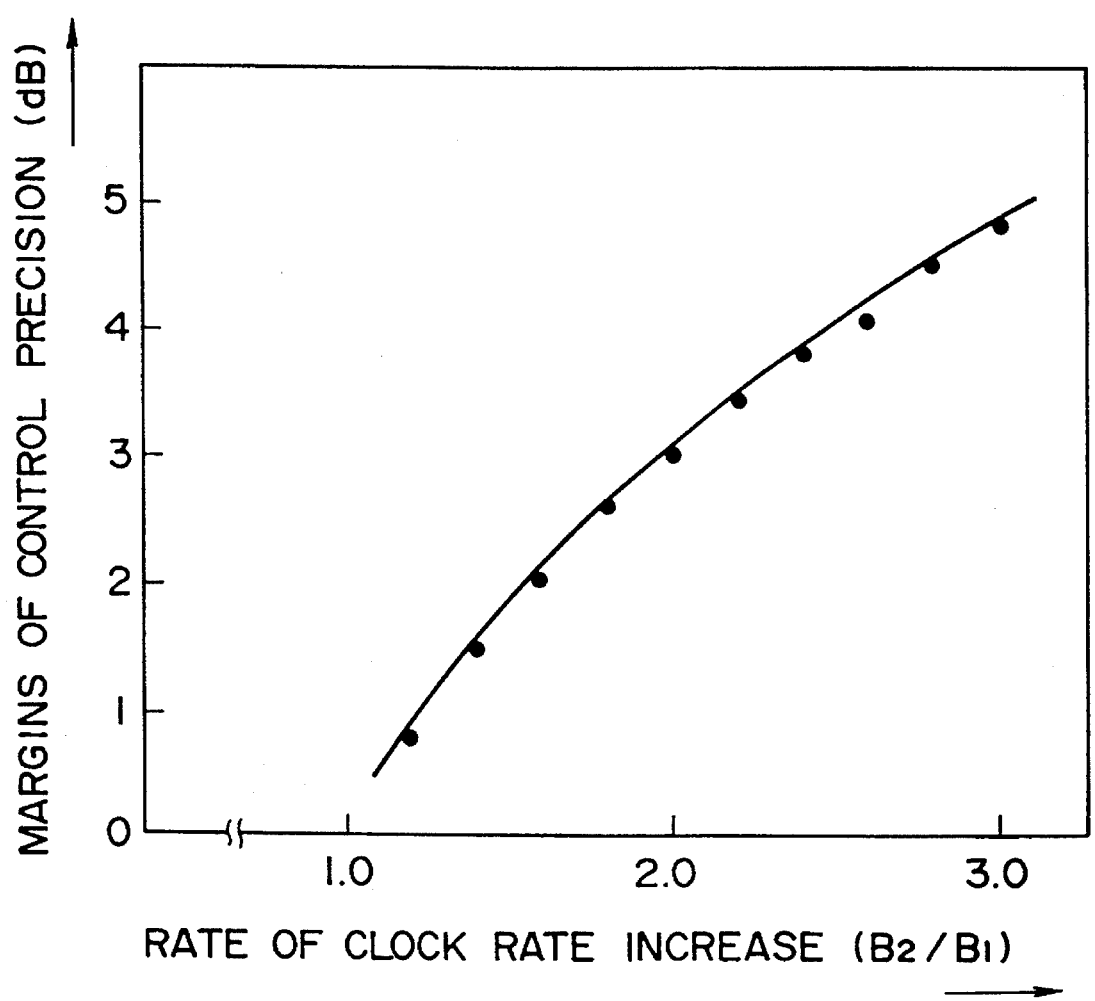
FIG. 16 is a view depicting a relationship between raised PN code clock rates and increased margins of power control precision in connection with the second embodiment.

FIG. 16 is a view depicting a relationship between raised transmission spread code clock rates and increased margins of power control precision in connection with the second embodiment. As illustrated, raising the transmission spread code clock rate-near the upper limit of the system's line capacity provides the output high-power amplifier 108 with significantly greater margins of power control precision.

The theory of spread spectrum communication dictates that at least a power control precision level of 0.5 dB is required in order to maintain about 90 percent of the system's theoretical line capacity. Multiplying the clock rate of the spread code by, say, 1.2 provides an extra margin of 0.8 dB. This means that the line capacity is maintained at a power control precision level of 1.3 dB. The increased margin of power control precision translates into a much simpler construction of the power control circuit in the transmitting portion of the mobile station.

Because the process gain is raised by increasing the clock rate of the transmission spread code, the gain of the output amplifier 108 may be reduced under control of the BER detector 115 to the lowest practicable level as long as the minimum bit error rate is not exceeded. This arrangement reduces power dissipation.

Figure 17:
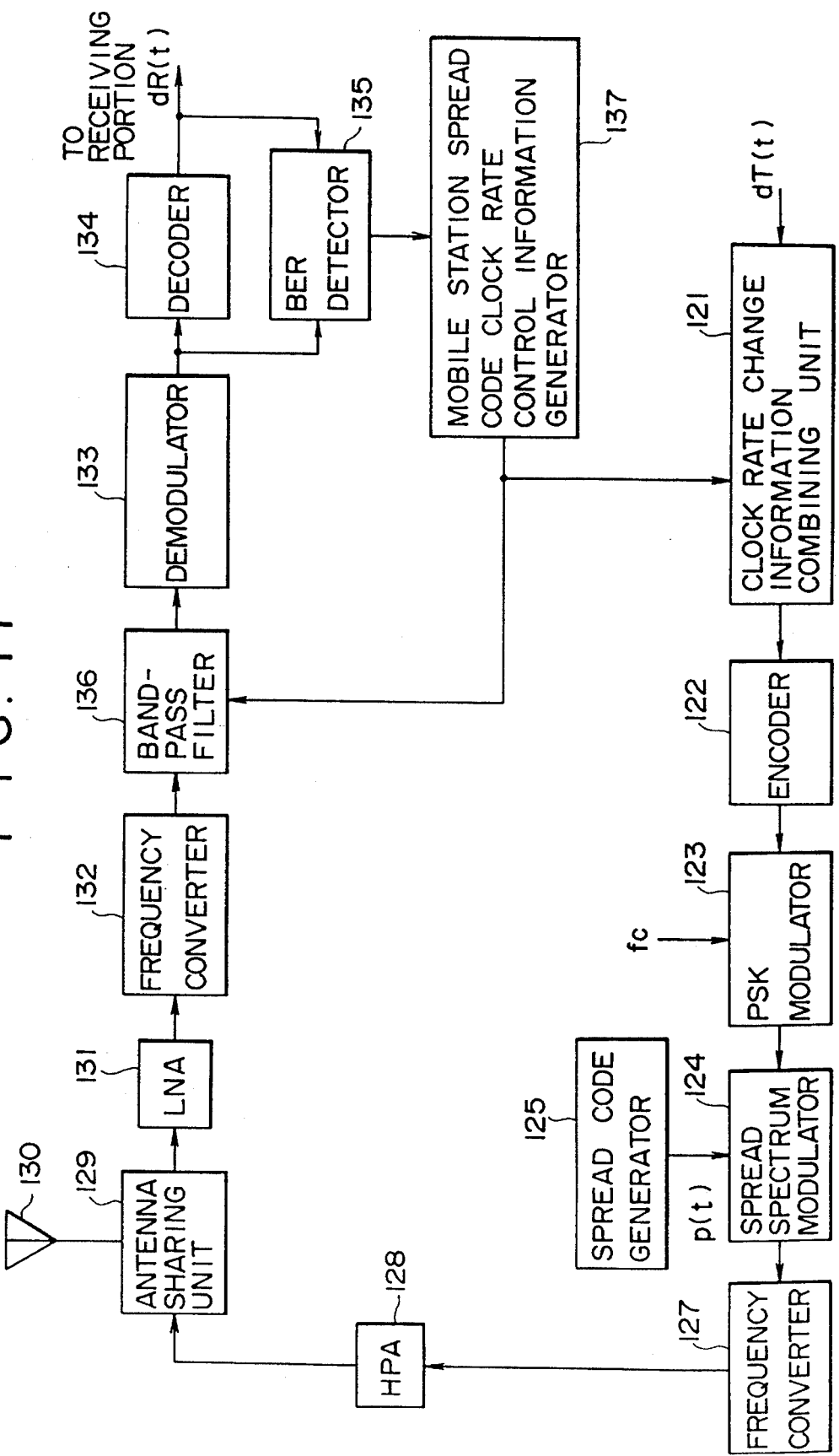
FIG. 17 is a block diagram of a base station practiced as a third embodiment of the invention.
Figure 18:
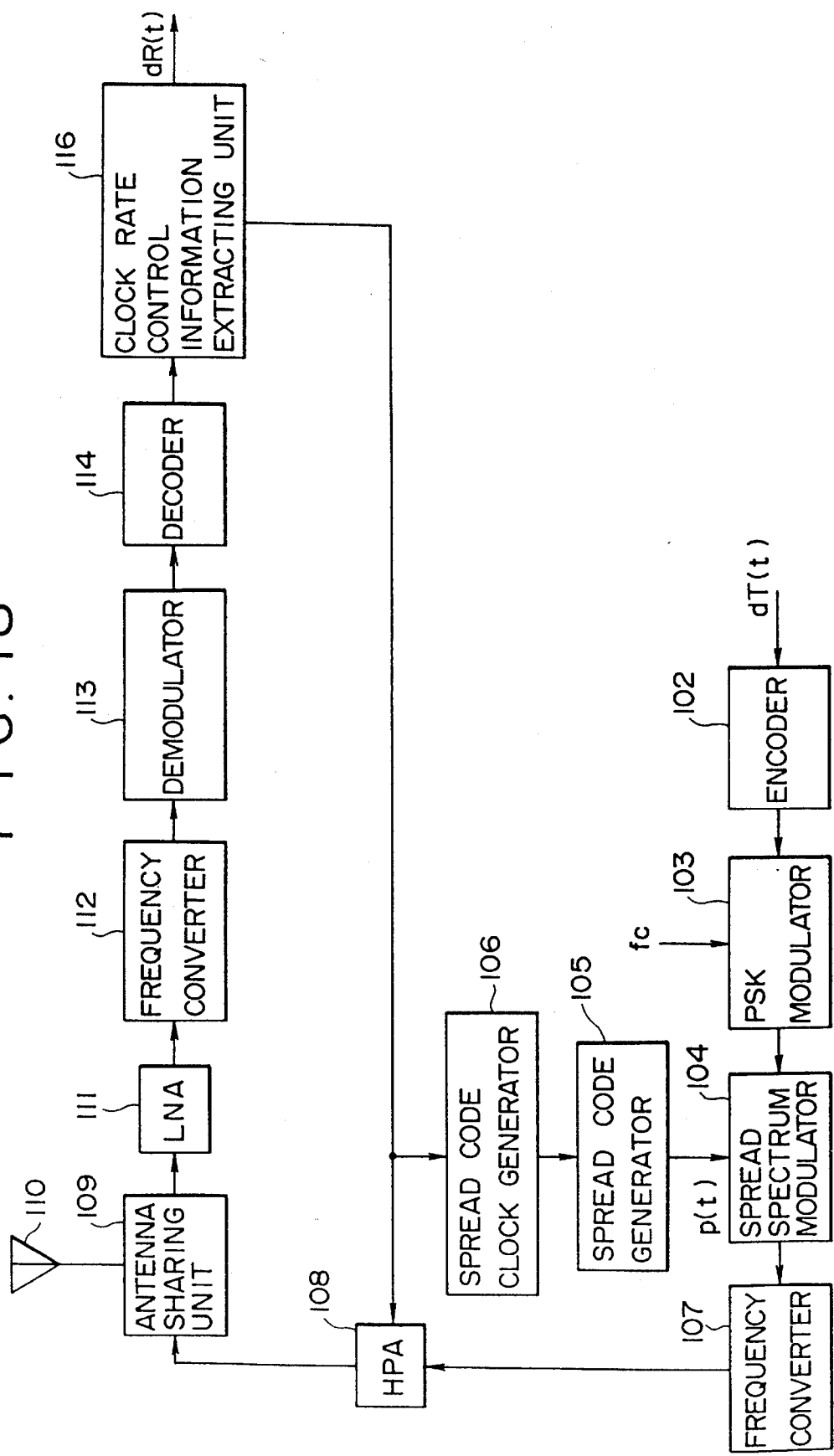
FIG. 18 is a block diagram of a mobile station practiced as a fourth embodiment of the invention.

FIG. 17 is a block diagram of a base station practiced as the third embodiment of the invention, and FIG. 18 is a block diagram of a mobile station practiced as the fourth embodiment of the invention. Referring to FIG. 17, a spread spectrum signal from a mobile station enters a transmitting-receiving antenna 130, passes through an antenna sharing unit 129 and a low-noise amplifier 131, and reaches a frequency converter 132. The frequency converter 132 converts the center frequency of the spread spectrum signal to the operating frequency of a demodulator 133. The spread spectrum signal output by the frequency converter 132 passes through a band-pass filter 136 and arrives at the demodulator 133. The demodulator 133 puts the signal received to reverse spread operation and PSK demodulation.

The signal from the demodulator 133, coded in error correcting code, is corrected for error by a decoder 134 and sent to a receiving portion downstream. The input and the output signals to and from the decoder 134 are supplied to a bit error rate (BER) detector 135 for BER calculation and evaluation. Near the upper limit of the system's line capacity, the bit error rate of the received signal from the mobile station can exceed a threshold value of about 3.0×10.

A mobile station spread code clock rate control information generator 137 generates and outputs clock rate control information for controlling the clock rate of the mobile station transmission spread code. If the BER detector 135 finds that the threshold value of about 3.0×10 is exceeded, the detector 135 causes the generator 137 to generate clock rate control information for raising the mobile station transmission spread code clock rate. At this point, the clock rate control information generator 137 causes the band-pass filter 136 to switch its pass band width to the clock rate designated by the control information in preparation for the next mobile station transmission.

Referring to FIG. 17, a transmitted signal dT(t) such as a digital audio signal is first fed to a clock rate control information combining unit 121. The combining unit 121 combines the transmitted signal dT(t) with the mobile station transmission spread code control information generated by the clock rate control information generator 137. The transmitted signal output by the combining unit 121 is coded in error correcting code by an encoder 122. The coded signal is sent to a PSK modulator 123 which is fed with a carrier fc from a carrier generator, not shown. The PSK modulator 123 subjects the carrier fc to bi-phase shift keying using the signal received.

The PSK-modulated signal from the PSK modulator 123 is supplied to a spread spectrum modulator 124 which is also fed with a spread code p(t). Using the spread code p(t), the spread spectrum modulator 124 puts the PSK-modulated signal to spread spectrum modulation. The spread spectrum signal from the spread spectrum modulator 124 has its center frequency converted to a high frequency by a frequency converter 127. The resulting signal from the frequency converter 127 passes through an output (high-power) amplifier 128 and an antenna sharing unit 129. Going past the antenna sharing unit 129, the signal reaches a transmitting-receiving antenna 130 which transmits the signal to the mobile station.

As mentioned, FIG. 18 is a block diagram of a mobile station practiced as the fourth embodiment of the invention. In the fourth embodiment, the parts that are functionally identical to those already described in connection with the second embodiment of FIG. 14 are designated by the same reference numerals, and repetitive descriptions thereof are abbreviated. In the fourth embodiment, the signal received from the base station is processed in the same manner as in the second embodiment tip to the decoder 114. The decoder 114 outputs the received signal combined with mobile station transmission spread code clock rate control information. This signal is fed to a clock rate control information extracting unit 116. The extracting unit 116 rids the signal received of its clock rate control information and forwards the resulting signal dR(t) to a receiving portion downstream.

The clock rate control information extracted by the extracting unit 116 is supplied to the spread code clock generator 106 for control over transmission spread code clock rates. The constructions and functions of the other parts in the fourth embodiment of FIG. 18 are the same as in the second embodiment of FIG. 14.

The fourth embodiment of the above constitution works as follows: The base station generates clock rate control information for raising the clock rate of the mobile station transmission spread code as per the output of the BER detector 135 where the transmission quality of the received signal of the base station degenerates near the upper limit of the system's line capacity. The clock rate control information is thus combined with the transmitted signal dT(t) and transmitted to the mobile station. Upon receipt of the signal, the mobile station raises the clock rate of the transmission spread code from the transmission spread code clock generator 106 in accordance with the clock rate control information extracted by the clock rate control information extracting unit 116. When the base station receives from the mobile station the signal with its spread code clock rate changed, the band width of the band-pass filter 136 is made to match the mobile station transmission spread code clock rate under control of the clock rate control information generator 137. Thus the demodulator 133 performs reverse spread operation and demodulation appropriately.

The above-described workings of control shorten the period Tp of the change in the transmission spread code p(t) in the vicinity of the upper limit of the system's line capacity, enhance the process gain of spread spectrum operation and increase margins of power control precision. It follows that, as in the case of the second embodiment in FIG. 14, the fourth embodiment allows the power control circuit of the mobile station to be appreciably simplified in construction.

The fourth embodiment is not limitative of the invention. A modification of the embodiment may involve reducing the gain of the output amplifier 108 to the lowest practicable level as long as the minimum bit error rate (BER) is not exceeded, because the process gain is increased by raising the transmission spread code clock rate. This modification reduces power dissipation. Another modification of the fourth embodiment may be to determine the transmission quality of the signal using an S/N ratio detection circuit instead of the BER detection arrangement. A further modification may be to utilize QPSK or any other suitable modulation method in place of the bi-phase shift keying (BPSK) modulation.

Figure 19:
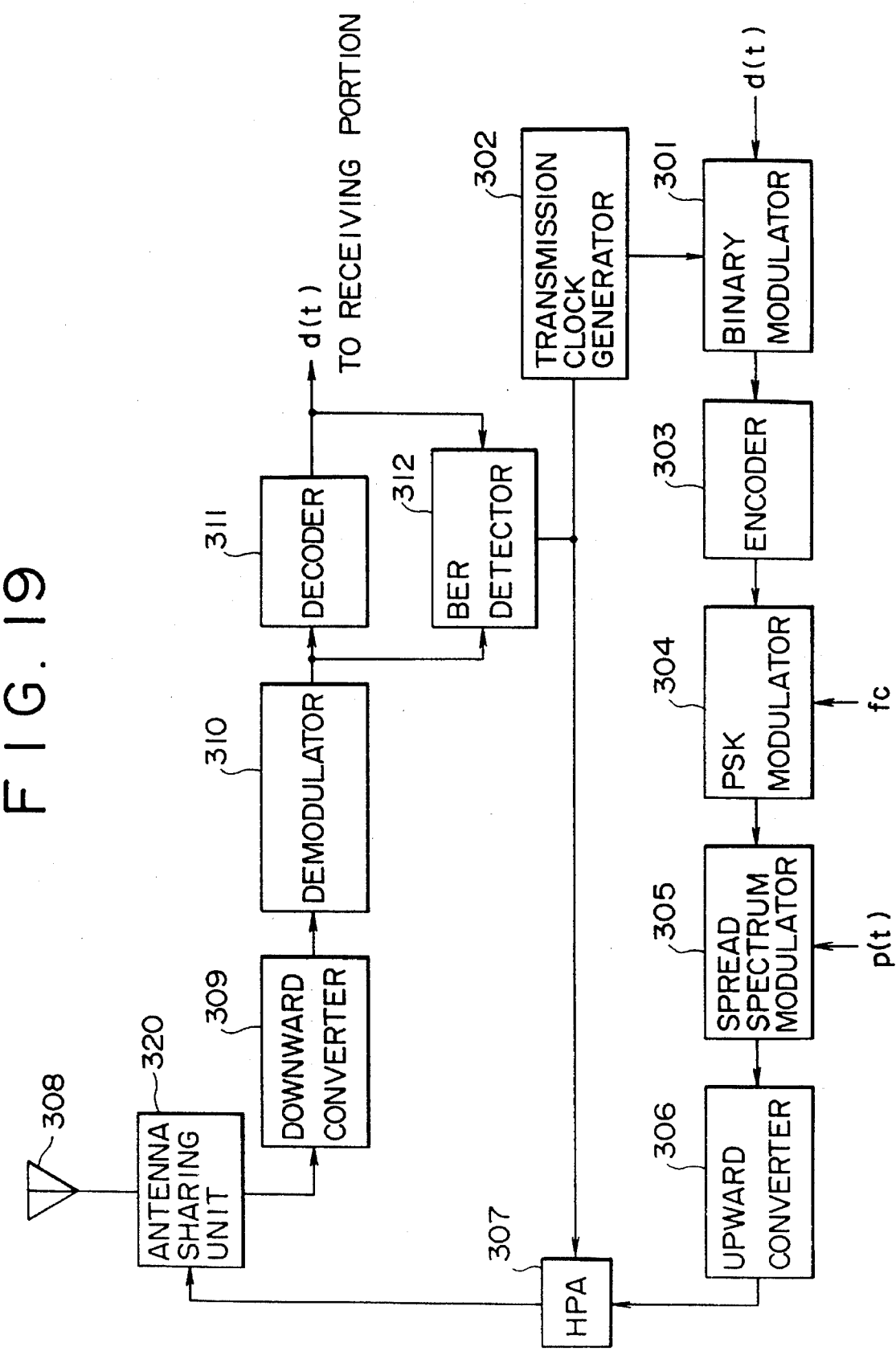
FIG. 19 is a block diagram of a mobile station practiced as a fifth embodiment of the invention.

FIG. 19 is a block diagram of a mobile station practiced as the fifth embodiment of the invention. The fifth embodiment operates in applications of spread spectrum communication between base station and mobile station. Referring to FIG. 19, a transmitted signal d(t) such as an analog audio signal is first fed to a binary modulator 301. The transmitted signal d(t) output by the binary modulator 301 is a binary coded signal. The period Td of the transmitted signal d(t) is determined by the transmission clock rate of a transmission clock generator 302.

The transmitted signal d(t) from the binary modulator 301 is coded in error correcting code by an encoder 303. The coded signal is sent to a PSK modulator 304 which is fed with a carrier fc from a carrier generator, not shown. The PSK modulator 304 subjects the carrier fc to bi-phase shift keying using the transmitted signal d(t).

The PSK-modulated signal from the PSK modulator 304 is supplied to a spread spectrum modulator 305 which is also fed with a spread signal p(t). Using the spread signal p(t), the spread spectrum modulator 305 puts the PSK-modulated signal to spread spectrum modulation.

The spread spectrum signal from the spread spectrum modulator 305 has its center frequency converted to a high frequency by an upward converter 306. The resulting signal from the upward converter 306 is sent via an output (high-power) amplifier 307 to a transmitting-receiving antenna 308. The antenna 308 transmits the signal to the base station.

The spread spectrum signal from the base station is admitted through the transmitting-receiving antenna 308 and fed to a downward converter 309. The downward converter 309 converts the center frequency of the spread spectrum signal to the same frequency as that of the carrier fc. The spread spectrum signal from the downward converter 309 is supplied to a demodulator 310 for spread spectrum demodulation and PSK demodulation.

The demodulator 310 outputs the signal d(t) coded in error correcting code. The coded signal is corrected for error by a decoder 311 before being sent to a receiving portion downstream. The input and output signals to and from the decoder 311 are fed to a bit error rate (BER) detector 312 for BER calculation and evaluation. In the vicinity of the tipper limit of the system's line capacity, the bit error rate of the received signal of the mobile station can exceed a threshold value of about $3.0 \times 10^{-3}$. If the BER detector 312 finds that the bit rate error exceeds the threshold value of $3.0 \times 10^{-3}$, the BER detector 312 causes the transmission clock generator 302 to reduce the transmission clock rate.

In the fifth embodiment of the above constitution, as described, the BER detector 312 causes the transmission clock generator 302 to reduce the transmission clock rate where the transmission quality of the received signal degenerates near the upper limit of the system's line capacity. This prolongs the period Td of the transmitted signal d(t) near the upper limit of the system's line capacity, thereby improving the process gain of spread spectrum operation and increasing the margins of power control precision.

Figure 20:
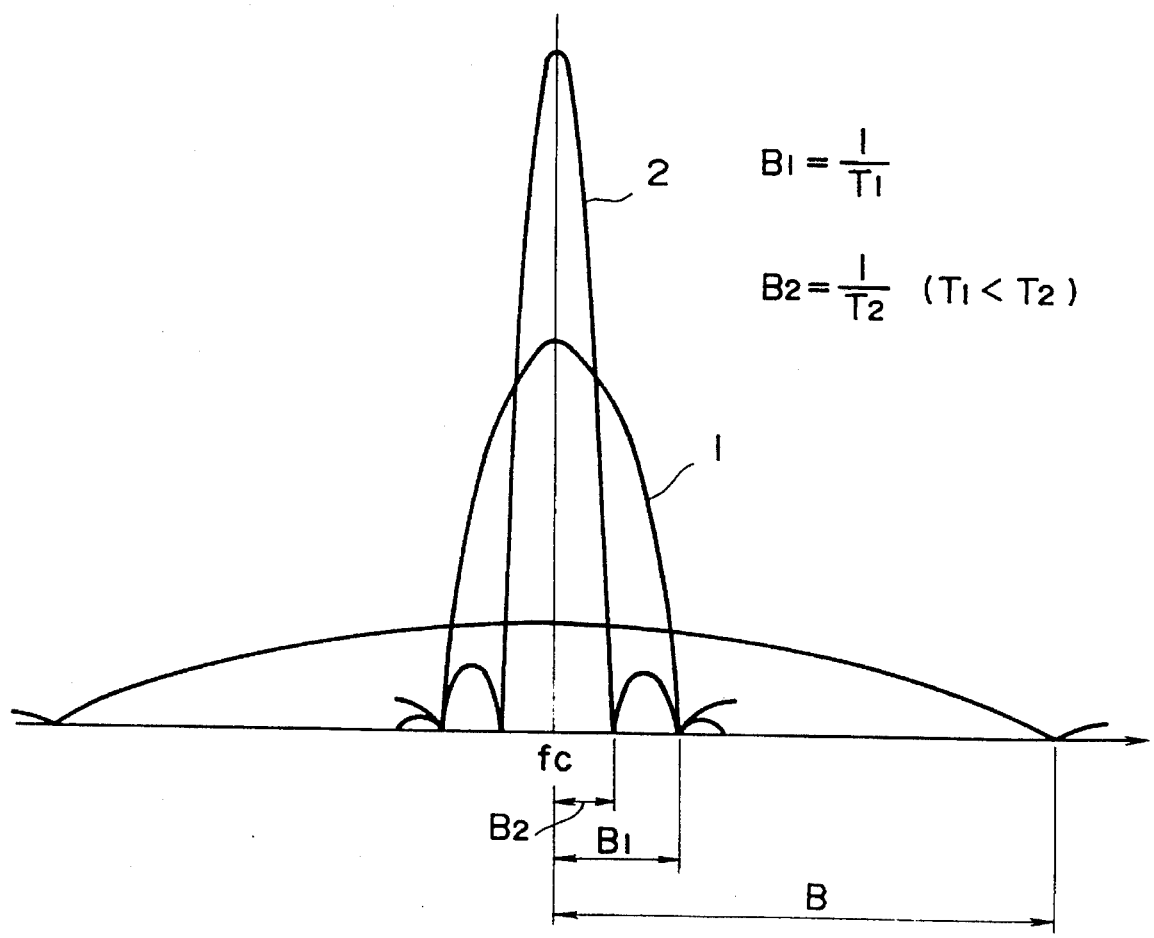
FIG. 20 is a view of a relationship between clock rates and process gain in connection with the fifth embodiment.

FIG. 20 is a view of a relationship between clock rates and process gain in connection with the fifth embodiment. If the process gain is denoted by Gp, then $Gp = B/B_1$ for characteristic (1) in the figure, and $Gp = B/B_2$ for characteristic (2). Lowering the clock rate from $T_1$ to $T_2$ sharpens the frequency spectrum characteristic and thereby improves the process gain by $B_1/B_2$.

Figure 21:
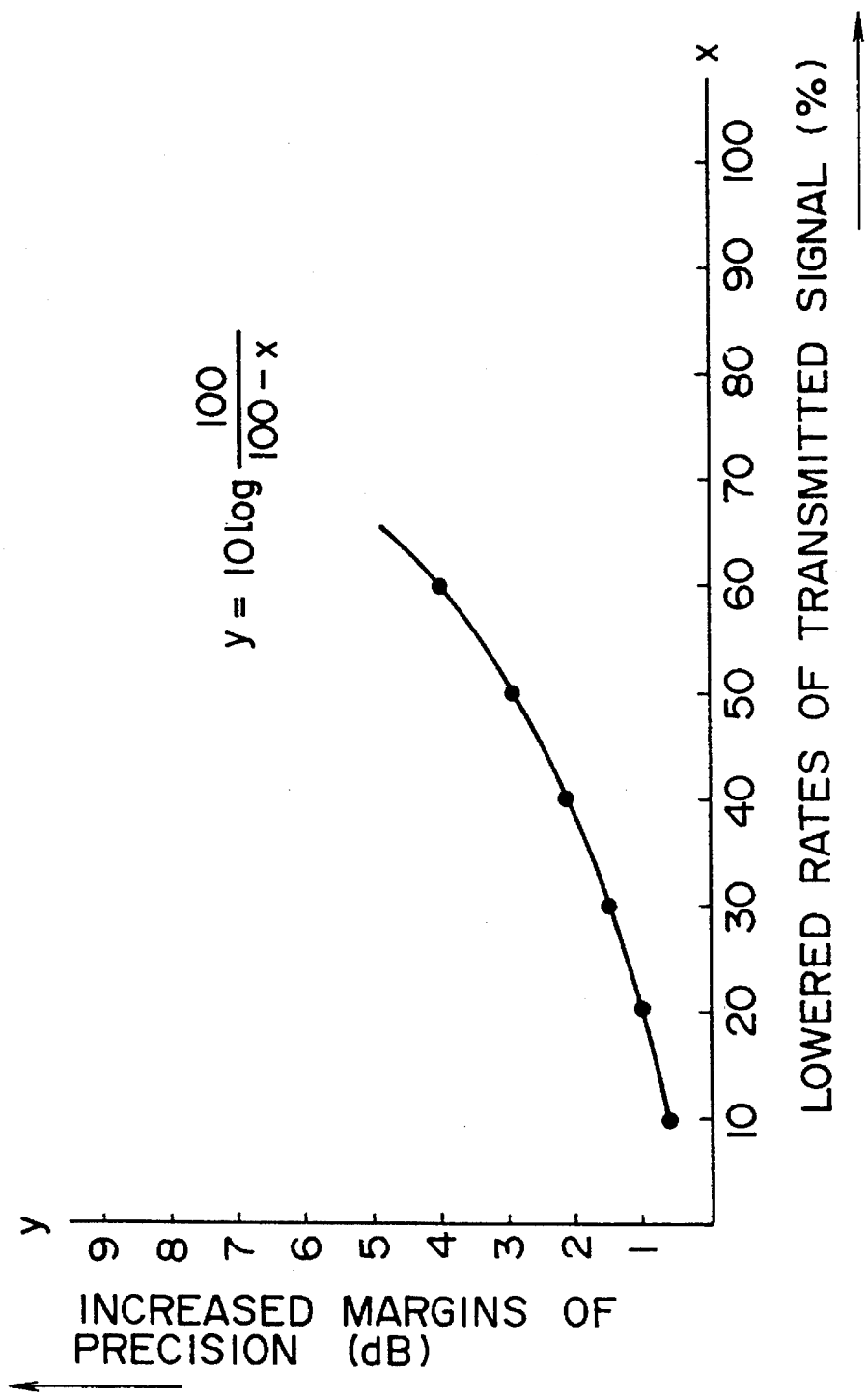
FIG. 21 is a view of a relationship between reduced transmitted signal speeds and increased margins of power control precision in connection with the fifth embodiment.

FIG. 21 is a view of a relationship between reduced transmitted signal speeds and increased margins of power control precision in connection with the fifth embodiment. As described, lowering the clock rate near the upper limit of the system's line capacity supplements the control precision of the output amplifier 307 with the extra margins shown in FIG. 21.

The highest precision level theoretically required of the spread spectrum communication method is within 0.5 dB, as mentioned earlier. Lowering the clock rate by, say, 10 percent provides an extra margin of 0.5 dB in terms of power control precision. That is, the most stringent precision requirement is met with a power control precision margin of 1.0 dB. This means that the precision requirement for the mobile station may be much less rigorous than before where the fifth embodiment is employed.

Lowering the clock rate of the transmitted signal increases the energy of that signal. Given the signal energy increase, the gain of the output amplifier 307 may be reduced to the lowest practicable level under control of the BER detector 312 as long as the bit error rate does not deteriorate. This reduces power dissipation.

Figure 22:
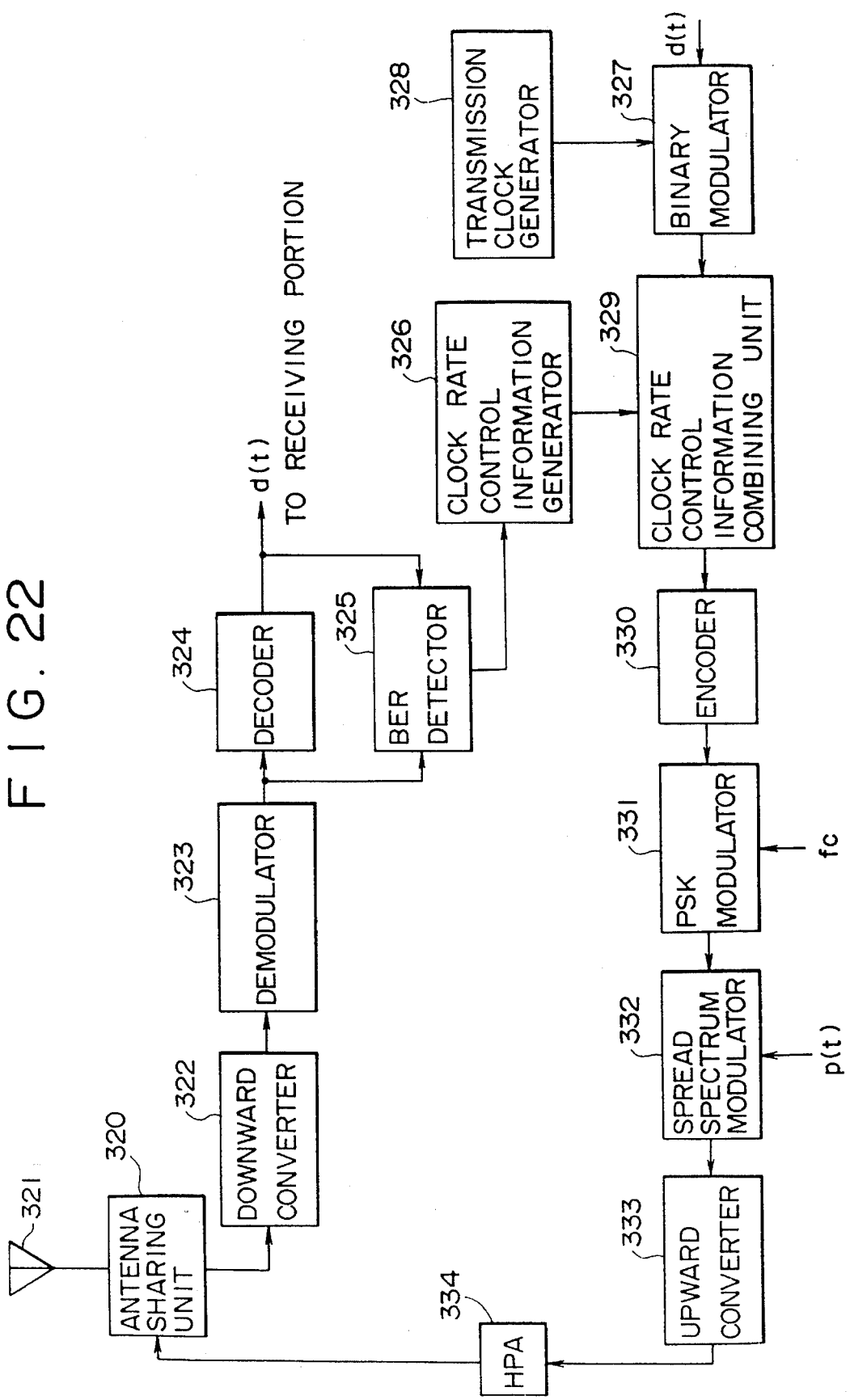
FIG. 22 is a block diagram of a base station practiced as a sixth embodiment of the invention.
Figure 23:
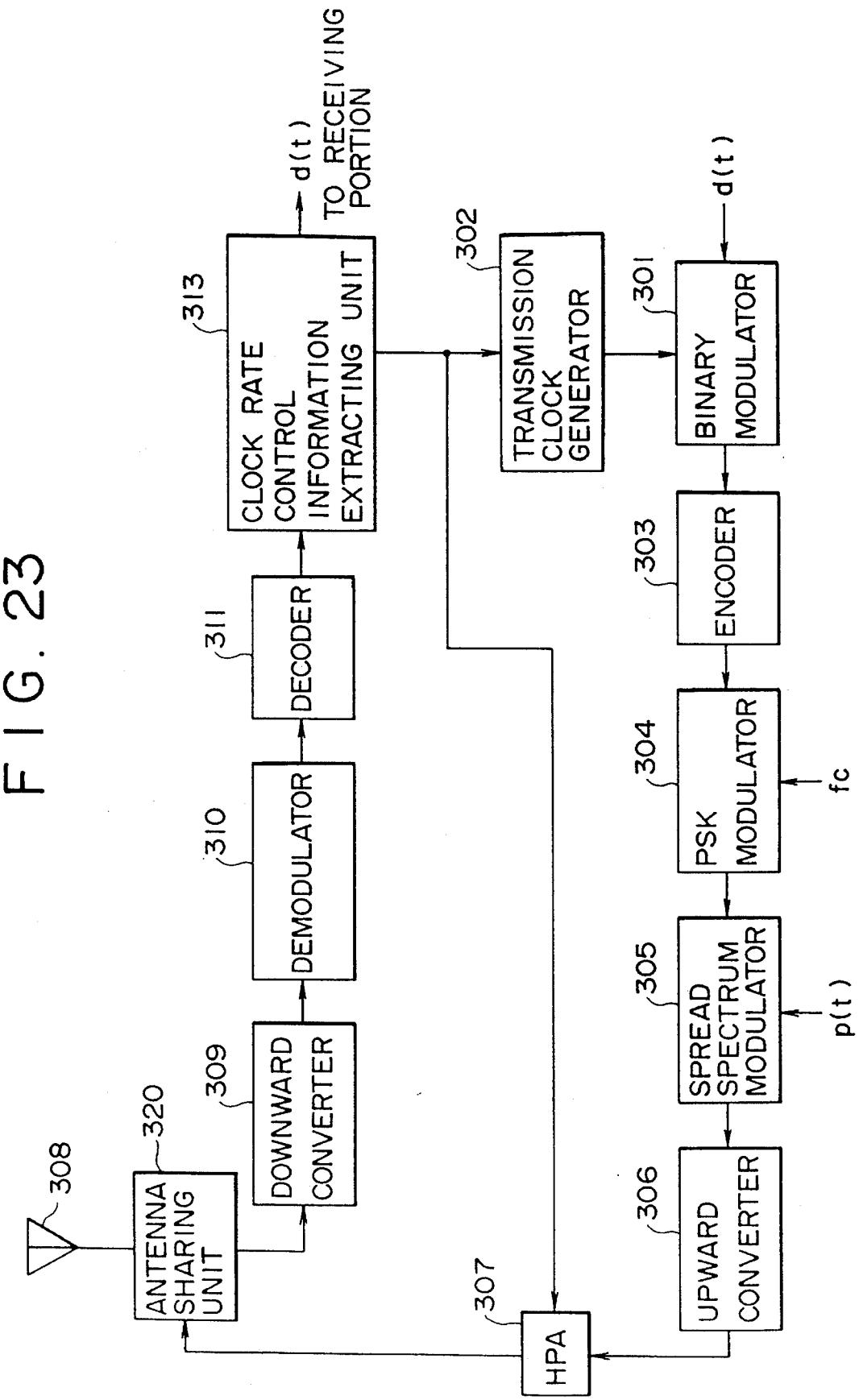
FIG. 23 is a block diagram of a mobile station practiced as a seventh embodiment of the invention.

FIG. 22 is a block diagram of a base station practiced as the sixth embodiment of the invention, and FIG. 23 is a block diagram of a mobile station practiced as the seventh embodiment of the invention. Referring to FIG. 22, a spread spectrum signal From a mobile station is admitted through a transmitting-receiving antenna 321 into a downward converter 322. The downward converter 322 converts the center frequency of the received signal to the same frequency as that of the carrier fc.

The spread spectrum signal output by the downward converter 322 is fed to a demodulator 323 for spread spectrum demodulation and PSK demodulation. The demodulator 323 outputs a signal d(t) coded in error correcting code. The coded signal d(t) is corrected for error by a decoder 324 before being sent to a receiving portion downstream.

The input and output signals to and from the decoder 324 are supplied to a bit error rate (BER) detector 325 for BER calculation and evaluation. In the vicinity of the upper limit of the system's line capacity, the bit error rate of the received signal from the mobile station can exceed a threshold value of about $3.0 \times 10^{-1}$.

A clock rate control information generator 326 generates and outputs clock rate control information for controlling the transmission clock rate of the mobile station. If the BER detector 326 finds that the bit error rate exceeds the threshold value of $3.0 \times 10^{-3}$, the BER detector 325 causes the generator 326 to generate clock rate control information for reducing the transmission clock rate.

The transmitted signal d(t) such as an analog audio signal is supplied to a binary modulator 327. In turn, the binary modulator 327 outputs the transmitted signal d(t) as a binary coded signal. The period Td of the transmitted signal d(t) is determined according to the transmission clock rate provided by a transmission clock generator 328.

The transmitted signal d(t) output by the binary modulator 327 is sent to a clock rate control information combining unit 29. The combining unit 29 combines the transmitted signal d(t) with the clock rate control information generated by the clock rate control information generator 326.

The transmitted signal d(t) combined with the clock rate control information from the combining unit 329 is coded in error correcting code by an encoder 330. The coded signal is forwarded to a PSK modulator 331 which is fed with the carrier fc from a carrier generator, not shown. The PSK modulator 331 subjects the carrier fc to bi-phase shift keying using the transmitted signal d(t)

The PSK-modulated signal from the PSK modulator 331 is supplied to a spread spectrum modulator 332. The spread spectrum modulator 332 is also fed with the spread signal p(t). Using the spread signal p(t), the spread spectrum modulator 332 subjects the PSK-modulated signal to spread spectrum modulation.

The spread spectrum signal output by the spread spectrum modulator 332 has its center frequency converted to a high frequency by an upward converter 333. The converted signal from the upward converter 333 is sent via an output amplifier (high-power amplifier) 334 to the transmitting-receiving antenna 321. The antenna 321 transmits the signal to the mobile station.

FIG. 23 is a block diagram of a mobile station practiced as the seventh embodiment of the invention. In the seventh embodiment of FIG. 23, the parts that are functionally identical to those already described in connection with the fifth embodiment of FIG. 19 are designated by the same reference numerals, and repetitive descriptions thereof are abbreviated.

Referring to FIG. 23, the signal d(t) output by a decoder 311 and combined with clock rate control information is sent to a clock rate control information extracting unit 313. The extracting unit 313 rids the signal received of its clock rate control information and forwards the resulting signal d(t) to a receiving portion downstream. The clock rate control information extracted by the extracting unit 313 is fed to a transmission clock generator 302 for control over transmission clock rates. The constructions and functions of the other parts in the seventh embodiment of FIG. 23 are the same as in the fifth embodiment of FIG. 19.

The seventh embodiment of the above constitution works as follows: The generator 326 of the base station generates clock rate control information for raising the clock rate of the transmitted signal where the transmission quality of the received signal of the base station degenerates near the upper limit of the system's line capacity. The clock rate control information is combined with the transmitted signal d(t) and transmitted to the mobile station. The clock rate controls information extracted by the extracting unit 313 of the mobile station lowers the rate of the transmission clock from the transmission clock generator 302. As a result, the period Id of the change in the transmitted signal d(t) is prolonged near the upper limit of the system's line capacity. This affords greater margins of power control precision to the power control circuit and contributes to making the precision requirement of the mobile station more lenient, as with the fifth embodiment of FIG. 19.

Lowering the clock rate of the transmitted signal raises the energy of that signal. Given the signal energy increase, the gain of the output amplifier 307 may be reduced to the lowest practicable level according to the clock rate control information detected by the extracting unit 313 as long as the bit error rate does not deteriorate. This reduces power dissipation.

The seventh embodiment determines the transmission quality of the signal by detecting the bit error rate thereof. Alternatively, the transmission quality may be determined by use of an S/N ratio detection circuit. Another alternative is to detect the amount of traffic instead of transmission quality for control purposes.

Figure 24:
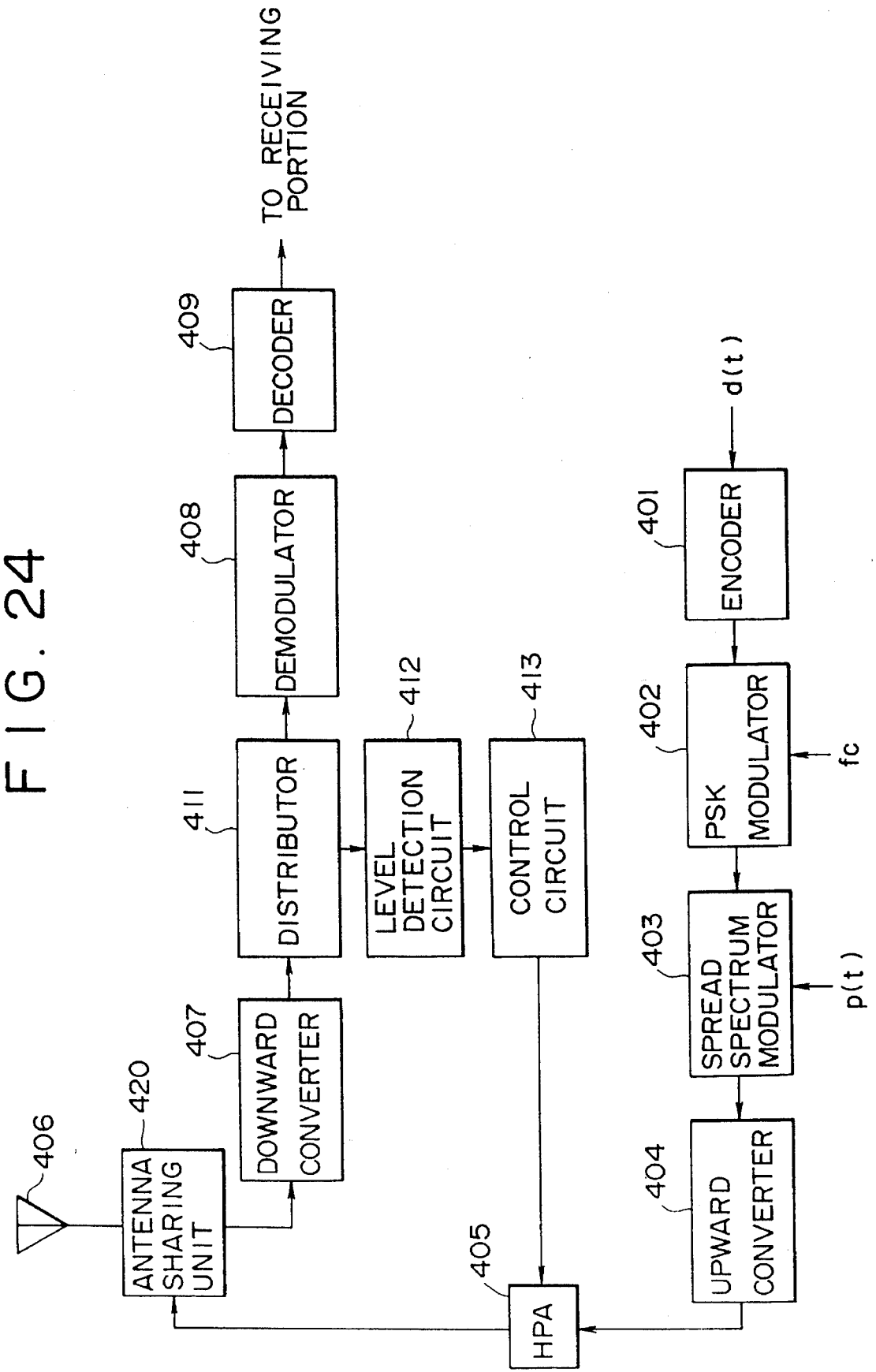
FIG. 24 is a block diagram of a mobile station practiced as an eighth embodiment of the invention.

FIG. 24 is a block diagram of a mobile station practiced as the eighth embodiment of the invention. The embodiment involves applying the invention to a mobile station for SS-CDMA communications where the base station maintains the same level of transmitting power on all transmitting channels In such cases, the transmitting power level serves as the reference for signal intensity Referring to FIG. 24, a spread spectrum signal (composite signal of the signals on all channels) output by a downward converter 407 is sent via a distributor to a demodulator 408. The spread spectrum signal distributed by the distributor 411 is also fed to a level detection circuit 412. The level detection circuit 412 detects the level of the received signal.

A control circuit 413 compares the transmitting power of the base station with that level of the received signal which is detected by the level detection circuit 412. The comparison allows the circuit 413 to estimate power losses over propagation paths. Accordingly the control circuit 413 adjusts the gain of an output amplifier 405 to control the transmitting power so that the base station will maintain an appropriate received signal level. This transmitting power control operation is carried out repeatedly.

The eighth embodiment keeps the transmitting power at the appropriate level all the time. This means that the mobile station can communicate with the base station at the appropriate transmitting power level from the first transmission onward. Because of its ability to receive signals at the appropriate level from the start, the base station ensures stable and unfailing communications. Since the mobile station can transmit its signal always at the appropriate power level, the power consumption of the mobile station is reduced. This leads to a smaller size and a longer life of the batteries incorporated in the mobile station. With its signal always transmitted at the appropriate power level, the mobile station avoids interference with other communications. For SS-CDMA communications that are particularly vulnerable to interference waves, the eighth embodiment allows the system's line capacity to be set close to its theoretical upper limit.

Figure 25:
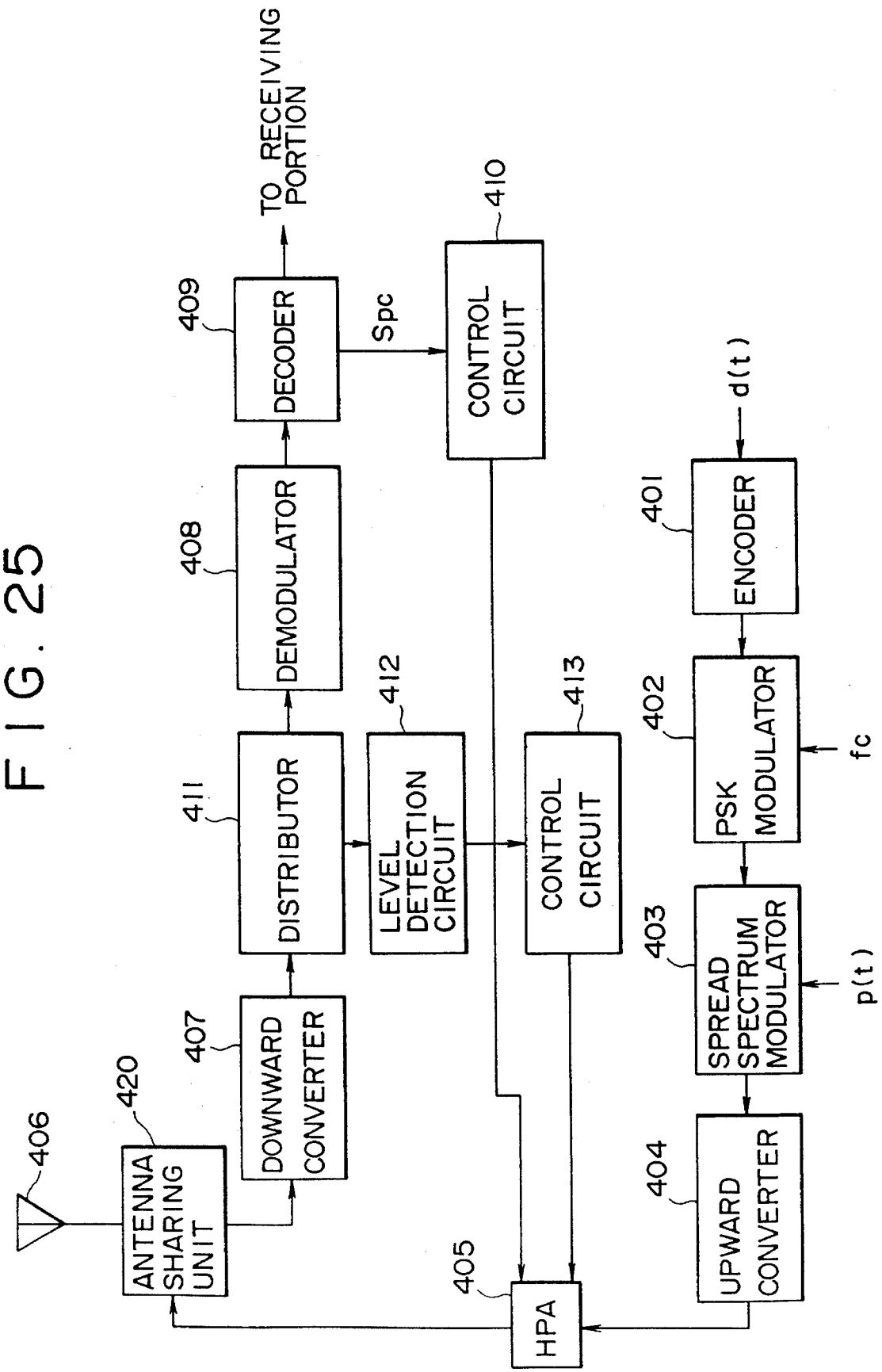
FIG. 25 is a block diagram of a mobile station practiced as a ninth embodiment of the invention.

FIG. 25 is a block diagram of a mobile station practiced as the ninth embodiment of the invention. As illustrated in the figure, the ninth embodiment, besides operating on the control method described above, is also capable of controlling the transmitting power by use of a power control signal Spc superimposed on a traffic channel and transmitted from the base station. The additional Spc-based transmitting power control method may be used for fine power adjustment while the above-described method is used for coarse adjustment.

Figure 26:
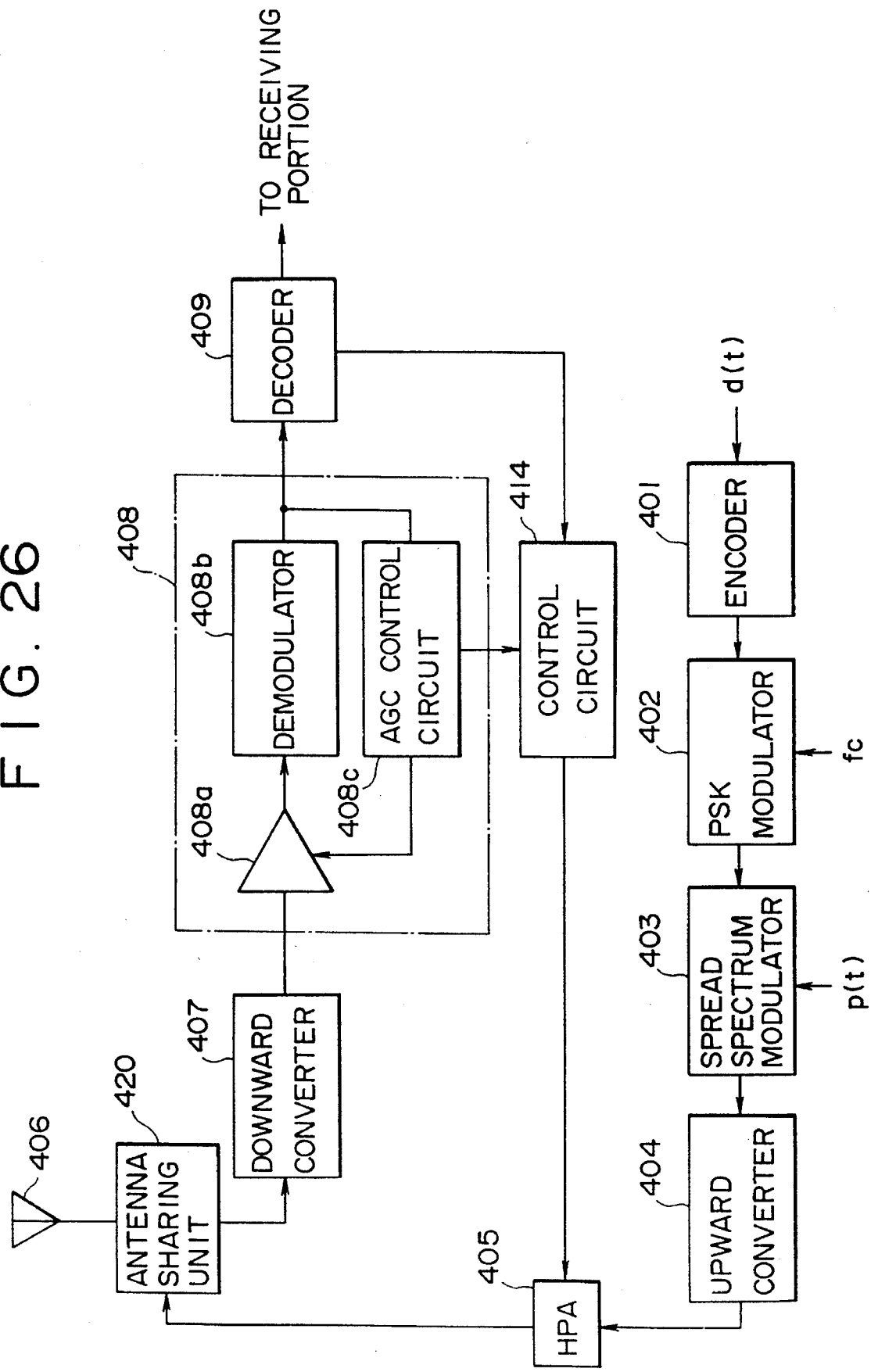
FIG. 26 is a block diagram of a mobile station practiced as a tenth embodiment of the invention.
Figure 27:
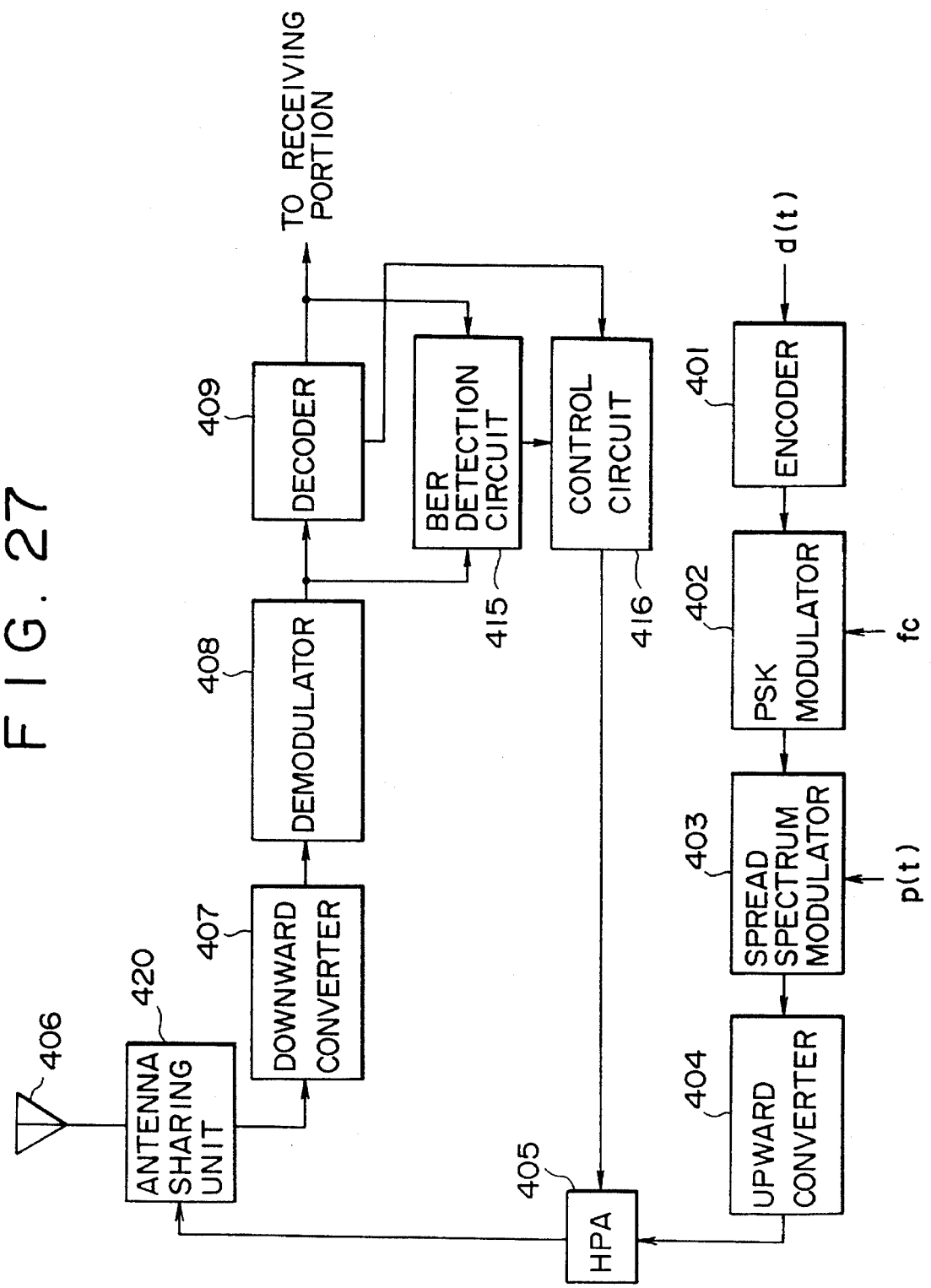
FIG. 27 is a block diagram of a mobile station practiced as an eleventh embodiment of the invention.

FIG. 26 is a block diagram of a mobile station practiced as the tenth embodiment of the invention, and FIG. 27 is a block diagram of a mobile station practiced as the eleventh embodiment of the invention. These embodiments involve applying the invention to mobile stations for SS-CDMA communications where the base station transmits information about its total transmitting power over a control channel. That information serves as the reference for the intensity of transmitting power Referring to FIG. 26, a spread spectrum signal output by a downward converter 407 is sent via an AGC amplifier 408a to a demodulator 408b. The demodulator 408b subjects the signal received to spread spectrum demodulation and PSK demodulation. The output signal of the demodulator 408b is fed to a decoder 409. The output signal of the demodulator 408b is also supplied to an AGC control circuit 408c. The control circuit 408c controls the gain of the AGC amplifier 408a so that the output level of the demodulator 408b will reach a predetermined value. In that case, the control signal sent from the AGC control circuit 408c to the AGC amplifier 408a corresponds to the signal power of the receiving channel. This allows the AGC control circuit 408c to measure the signal power of the receiving channel. The result of the measurement is sent to a control circuit 414.

The control circuit 414 compares the result of signal power measurements on the receiving channel with the transmitting power information decoded by the decoder 409. The comparison allows the control circuit 414 to estimate power losses over propagation paths. Accordingly, the control circuit 414 adjusts the gain of an output amplifier 405 to control the transmitting power so that the base station will maintain an appropriate received signal level. This transmitting power control operation is carried out repeatedly.

Referring now to FIG. 27, the input to and the output from a decoder 409 are detected by a bit error rate (BER) detection circuit 415. The BER detection circuit 415 detects a bit error rate from the data received, and supplies the detected bit error rate to a control circuit 416.

Figure 28:
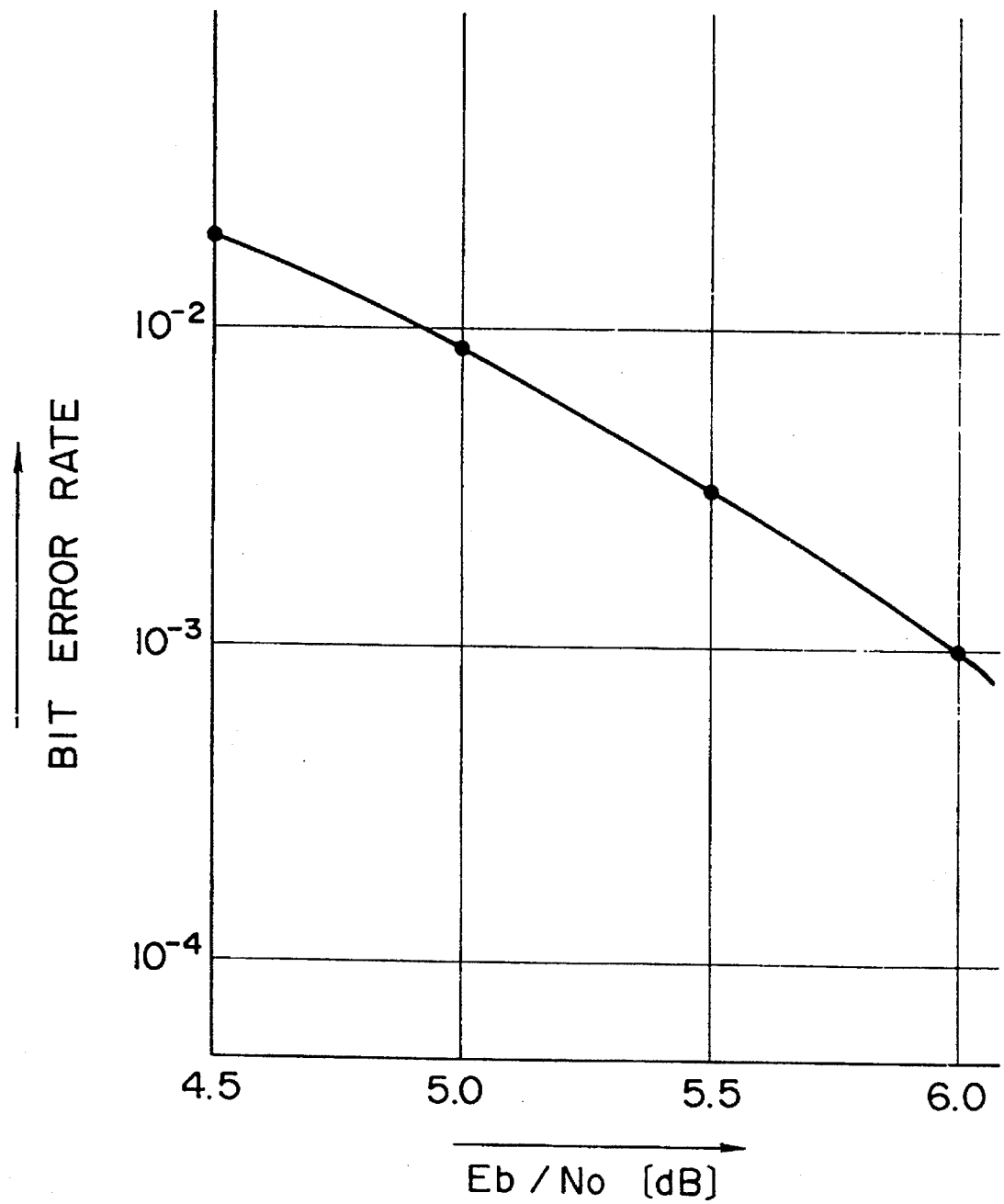
FIG. 28 is a view of a relationship between bit error rates and per-bit receiving power/interference power density ratios (Eb/No) in connection with the eleventh embodiment.

The control circuit 416 obtains the value of Eb/No from the received bit error rate and acquires the power level of the received signal from Eb/No, where Eb stands for the receiving power per bit and No for the power density of interference waves. FIG. 28 is a view of a relationship between bit error rates and per-bit receiving power/interference power density ratios (Eb/No) in connection with the eleventh embodiment operating on CDMA.

The control circuit 416 compares the received signal power with the transmitting power information supplied by the decoder 409. The comparison allows the control circuit 416 to estimate power losses over propagation paths. Accordingly, the control circuit 416 adjusts the gain of an output amplifier 405 to control the transmitting power so that the base station will maintain an appropriate received signal level This transmitting power control operation is carried out repeatedly.

When the receiving channel is switched from the control channel to the traffic channel (i.e., communication channel) in any one of the tenth embodiment of FIG. 26 and the eleventh embodiment of FIG. 27, the transmitting power information from the base station, if found the traffic channel, may be utilized to continue control over the transmitting power at the mobile station side. Thus with the transmitting power always held at the appropriate level, the tenth and the eleventh embodiments provide the same benefits as those of the foregoing embodiments.

The tenth and the eleventh embodiments of FIGS. 26 and 27, besides operating on the control method described above, are also capable of controlling the transmitting power by use of a power control signal Spc superimposed on the traffic channel and transmitted from the base station, as depicted in FIG. 25. The additional Spc-based transmitting power control method may be used for fine power adjustment while the above-described method is used for coarse adjustment.

It is to be understood that while the invention has been described in conjunction with specific embodiments, it is evident that many alternatives, modifications and variations will become apparent to those skilled in the art in light of the foregoing description. Accordingly, it is intended that the present invention embrace all such alternatives, modifications and variations as fall within the spirit and scope of the appended claims.

What is claimed is:

1. A spread spectrum communication system for performing spread spectrum communication by superimposing a pseudo noise signal on a transmitted signal, said spread spectrum communication system comprising:

transmission quality determining means for determining the transmission quality of a received signal; and means for changing the clock frequency of said pseudo noise signal in accordance with said transmission quality determined by said transmission quality determining means;

wherein said transmission quality determining means includes signal-to-noise ratio detecting means for addressing said received signal.

2. A spread spectrum transmitter-receiver for superimposing a pseudo noise signal on a transmitted signal and for receiving said transmitted signal containing the superimposed pseudo noise signal, said spread spectrum transmitter-receiver comprising:

transmission quality determining means for determining the transmission quality of a received signal;

means for controlling the clock rate of said pseudo noise signal in accordance with said transmission quality determined by said transmission quality determining means; and means for combining information about the changed clock rate with said transmitted signal, wherein said transmission quality determining means includes signal-to-noise ratio detecting means for addressing said received signal.

3. A spread spectrum transmitter-receiver comprising:

transmission quality determining means for determining the quality of a received signal from the other spread spectrum transmitter-receiver;

control data generating means for generating clock control data for controlling the clock rate of a pseudo noise signal from said other spread spectrum transmitter-receiver in accordance with said transmission quality determined by said transmission quality determining means;

data combining means for combining with a transmitted signal said clock control data generated by said control data generating means; and a band-pass filter circuit for controlling a passing band in accordance with the changed clock rate of said pseudo noise signal in said received signal from said other spread spectrum transmitter-receiver, wherein said transmission quality determining means includes signal-to-noise ratio detecting means for addressing said received signal.

4. A spread spectrum transmitter-receiver according to claim 3, further comprising:

data extracting means for extracting said clock control data from said received signal coming from said other spread spectrum transmitter-receiver; and clock control means for controlling the clock rate of said pseudo noise signal in accordance with said clock control data extracted by said data extracting means.

5. A spread spectrum transmitter-receiver system comprising:

a second spread spectrum transmitter-receiver having transmission quality determining means for determining the transmission quality of a received signal from a first spread spectrum transmitter-receiver, control data generating means for generating clock control data for controlling the clock rate of a pseudo noise signal from said first spread spectrum transmitter-receiver in accordance with said transmission quality determined by said transmission quality determining means, and data combining means for combining with a transmitted signal said clock control data generated by said control data generating means; and said first spread spectrum transmitter-receiver having data extracting means for extracting said clock control data from a received signal from said second spectrum transmitter-receiver, and clock control means for controlling the clock rate of said pseudo noise signal in accordance with said clock control data extracted by said data extracting means, wherein said transmission quality determining means includes signal-to-noise ratio detecting means for addressing said received signal.

6. A spread spectrum communication system for performing spread spectrum communication by superimposing a pseudo noise signal on a transmitted signal, said spread spectrum communication system comprising:

transmission quality determining means for determining the transmission quality of a received signal; and means for changing the clock frequency of said transmitted signal in accordance with said transmission quality determined by said transmission quality determining means, wherein said transmission quality determining means includes signal-to-noise ratio detecting means for addressing said received signal.

7. A spread spectrum transmitter-receiver for superimposing a pseudo noise signal on a transmitted signal and for receiving said transmitted signal containing the superimposed pseudo noise signal, said spread spectrum transmitter-receiver comprising:

transmission quality determining means for determining the transmission quality of a received signal;

means for controlling the clock rate of said transmitted signal in accordance with said transmission quality determined by said transmission quality determining means; and means for combining information about the changed clock rate with said transmitted signal, wherein said transmission quality determining means includes signal-to-noise ratio detecting means for addressing said received signal.

8. A spread spectrum transmitter-receiver system comprising:

a first spread spectrum transmitter-receiver having transmission quality determining means for determining the transmission quality of a received signal, control data generating means for generating clock control data for controlling the clock rate of a transmitted signal in accordance with said transmission quality determined by said transmission quality determining means, and data combining means for combining with said transmitted signal said clock control data generated by said control data generating means; and a second spread spectrum transmitter-receiver having data extracting means for extracting said clock control data from said received signal, and clock control means for controlling the clock rate of said transmitted signal in accordance with said clock control data extracted by said data extracting means, wherein said transmission quality determining means includes signal-to-noise ratio detecting means for addressing said received signal.

9. A spread spectrum communication system for performing spread spectrum communication by superimposing a pseudo noise signal on a transmitted signal, said spread spectrum communication system comprising:

transmission quality determining means for determining the transmission quality of a received signal; and means for changing the clock frequency of said pseudo noise signal in accordance with said transmission quality determined by said transmission quality determining means, wherein said transmission quality determining means includes bit error rate detecting means for addressing said received signal.

10. A spread spectrum transmitter-receiver for superimposing a pseudo noise signal on a transmitted signal and for receiving said transmitted signal containing the superimposed pseudo noise signal, said spread spectrum transmitter-receiver comprising:

transmission quality determining means for determining the transmission quality of a received signal;

means for controlling the clock rate of said pseudo noise signal in accordance with said transmission quality determined by said transmission quality determining means; and means for combining information about the changed clock rate with said transmitted signal, wherein said transmission quality determining means includes bit error rate detecting means for addressing said received signal.

11. A spread spectrum transmitter-receiver comprising:

transmission quality determining means for determining the quality of a received signal from the other spread spectrum transmitter-receiver;

control data generating means for generating clock control data for controlling the clock rate of a pseudo noise signal from said other spread spectrum transmitter-receiver in accordance with said transmission quality determined by said transmission quality determining means;

data combining means for combining with a transmitted signal said clock control data generated by said control data generating means; and a band-pass filter circuit for controlling a passing band in accordance with the changed clock rate of said pseudo noise signal in said received signal from said other spread spectrum transmitter-receiver, wherein said transmission quality determining means includes bit error rate detecting means for addressing said received signal.

12. A spread spectrum transmitter-receiver system comprising:

a second spread spectrum transmitter-receiver having transmission quality determining means for determining the transmission quality of a received signal from a first spread spectrum transmitter-receiver, control data generating means for generating clock control data for controlling the clock rate of a pseudo noise signal from said first spread spectrum transmitter-receiver in accordance with said transmission quality determined by said transmission quality determining means, and data combining means for combining with a transmitted signal said clock control data generated by said control data generating means; and said first spread spectrum transmitter-receiver having data extracting means for extracting said clock control data from a received signal from said second spread spectrum transmitter-receiver, and clock control means for controlling the clock rate of said pseudo noise signal in accordance with said clock control data extracted by said data extracting means, wherein said transmission quality determining means includes bit error rate detecting means for addressing said received signal.

13. A spread spectrum communication system for performing spread spectrum communication by superimposing a pseudo noise signal on a transmitted signal, said spread spectrum communication system comprising:

transmission quality determining means for determining the transmission quality of a received signal; and means for changing the clock frequency of said transmitted signal in accordance with said transmission quality determined by said transmission quality determining means, wherein said transmission quality determining means includes bit error rate detecting means for addressing said received signal.

14. A spread spectrum transmitter-receiver for superimposing a pseudo noise signal on a transmitted signal and for receiving said transmitted signal containing the superimposed pseudo noise signal, said spread spectrum transmitter-receiver comprising:

transmission quality determining means for determining the transmission quality of a received signal;

means for controlling the clock rate of said transmitted signal in accordance with said transmission quality determined by said transmission quality determining means; and means for combining information about the changed clock rate with said transmitted signal, wherein said transmission quality determining means includes bit error rate detecting means for addressing said received signal.

15. A spread spectrum transmitter-receiver system comprising:

a first spread spectrum transmitter-receiver having transmission quality determining means for determining the transmission quality of a received signal, control data generating means for generating clock control data for controlling the clock rate of a transmitted signal in accordance with said transmission quality determined by said transmission quality determining means, and data combining means for combining with said transmitted signal said clock control data generated by said control data generating means; and a second spread spectrum transmitter-receiver having data extracting means for extracting said clock control data from said received signal, and clock control means for controlling the clock rate of said transmitted signal in accordance with said clock control data extracted by said data extracting means, wherein said transmission quality determining means includes bit error rate detecting means for addressing said received signal.

\* \* \* \* \*